US008924098B2

(12) United States Patent
Zhdanov et al.

(10) Patent No.: US 8,924,098 B2
(45) Date of Patent: Dec. 30, 2014

(54) AUTOMATIC CONTROL OF A JOYSTICK FOR DOZER BLADE CONTROL

(71) Applicant: Topcon Positioning Systems, Inc., Livermore, CA (US)

(72) Inventors: Alexey Vladislavovich Zhdanov, Moscow (RU); Alexey Andreevich Kosarev, Moscow (RU); Arseny Alexeevich Chugunkin, Moscow (RU); Ivan Giovanni di Federico, Argenta (IT); Pavel Stanislavovich Yanchelik, Pavlovsky Posad (RU); Stanislav Georgievich Saul, Moscow (RU); Anton Sergeevich Tumanov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 130 days.

(21) Appl. No.: 13/780,315

(22) Filed: Feb. 28, 2013

(65) Prior Publication Data

US 2013/0261902 A1 Oct. 3, 2013

Related U.S. Application Data

(60) Provisional application No. 61/615,923, filed on Mar. 27, 2012.

(51) Int. Cl.

| | |
|---|---|
| ***G06F 19/00*** | (2011.01) |
| ***E02F 3/84*** | (2006.01) |
| ***E02F 3/76*** | (2006.01) |
| ***E02F 9/20*** | (2006.01) |
| ***G05G 9/047*** | (2006.01) |

(52) U.S. Cl.

CPC ............... *E02F 3/844* (2013.01); *E02F 3/7613* (2013.01); *E02F 3/7618* (2013.01); *E02F 9/2004* (2013.01); *G05G 9/047* (2013.01)

USPC ............................................................ 701/50

(58) Field of Classification Search

None

See application file for complete search history.

(56) References Cited

U.S. PATENT DOCUMENTS

| | | | |
|---|---|---|---|
| 2009/0069987 | A1 | 3/2009 | Omelchenko et al. |
| 2010/0299031 | A1 | 11/2010 | Zhdanov et al. |

FOREIGN PATENT DOCUMENTS

| | | |
|---|---|---|
| JP | 08249080 | 9/1996 |
| WO | 2011078431 A1 | 6/2011 |
| WO | 2013119140 | 8/2013 |

OTHER PUBLICATIONS

International Search Report and the Written Opinion of the International Searching Authority, dated May 16, 2013, corresponding to PCT Application PCT/US2013/030352, international filing date Mar. 12, 2013 (10 pages).

*Primary Examiner* — Thomas Tarcza
*Assistant Examiner* — Garrett Evans
(74) *Attorney, Agent, or Firm* — Wolff & Samson PC

(57) ABSTRACT

Dozers outfitted with manual or electric valves can be retrofitted with a control system for automatically controlling the elevation and orientation of the blade. No modification of the existing hydraulic drive system or existing hydraulic control system is needed. An arm is operably coupled to the existing joystick, whose translation controls the elevation and orientation of the blade. The arm is driven by an electrical motor assembly. Measurement units mounted on the dozer body or blade provide measurements corresponding to the elevation or orientation of the blade. A computational system receives the measurements, compares them to target reference values, and generates control signals. Drivers convert the control signals to electrical drive signals. In response to the electrical drive signals, the electrical motor assembly translates the arm, which, in turn, translates the joystick. If necessary, an operator can override the automatic control system by manually operating the joystick.

37 Claims, 13 Drawing Sheets

VIEW B

VIEW C

VIEW D

VIEW E
202
204
204R
204P
204E
250
251
252
252D
252E
253
255, 265
257
261
263
267
271
273
275
211P
211R
Z,Z'
X
X'
Y
Y'
O
O'
R
h
Δh

AUTOMATIC CONTROL OF A JOYSTICK FOR DOZER BLADE CONTROL

This application claims the benefit of U.S. Provisional Application No. 61/615,923 filed Mar. 27, 2012, which is incorporated herein by reference.

BACKGROUND OF THE INVENTION

The present invention relates generally to machine control, and more particularly to automatic control of a joystick for dozer blade control.

Automatic control systems for dozers have become increasingly popular in the construction equipment market. In an automatic control system, the position and orientation of the working implement (blade) of the dozer is determined with respect to a design surface; the blade is then automatically moved in accordance with the design surface. Automatic control systems are used, for example, to accurately produce design surfaces for the construction of building foundations, roads, railways, canals, and airports.

Automatic control systems have several advantages over manual control systems. First, manual control systems generally require more highly-skilled operators than automatic control systems: proper training of operators for manual control systems is both expensive and time-consuming. Second, automatic control systems increase the productivity of the machine by increasing the operational speed, permitting work in poor visibility conditions, avoiding downtime due to manual surveying of the site, and reducing the number of passes needed to produce the design surface. Third, automatic control systems reduce consumption of fuel as well as consumption of construction materials (construction standards call for a minimum thickness of paving material such as concrete, asphalt, sand, and gravel to be laid down; if the underlying surface is inaccurately graded, excess paving material needs to be laid down to ensure that the minimum thickness is met).

The operating principle of an automatic control system is based on the estimation of the current position and orientation of the dozer blade edge with respect to a reference surface defined by a specific project design. The reference surface can be specified in several ways. For example, the reference surface can be represented by a mathematical model, referred to as a digital terrain model (DTM), comprising an array of points connected by triangles. The reference surface can also be specified by natural or artificial surfaces and lines. A physical road surface is an example of a natural surface that can be used as a reference surface: the physical road surface can be used as the target for the next layer. Artificial surfaces and lines can be created, for example, by a laser plane or by metal wires installed on stakes.

The position and orientation of the blade can be determined from measurements by various sensors mounted on the dozer body and blade. Examples of sensors include global navigation satellite system (GNSS) sensors to measure positions; an optical prism to measure position with the aid of a laser robotic total station; electrolytic tilt sensors to measure angles; potentiometric sensors to measure angles and distances; microelectromechanical systems (MEMS) inertial sensors, such as accelerometers and gyros, to measure acceleration and angular rate, respectively; ultrasonic sensors to measure distances; laser receivers to receive signals from a laser transmitter and to measure vertical offsets; and stroke sensors to measure the extension of hydraulic cylinders.

Measurements from the various sensors are processed by a control unit to determine the position and orientation of the blade. The measured position and measured orientation of the blade are compared with the target position and target orientation, respectively, calculated from the reference surface. Error signals calculated from the difference between the measured position and the target position and the difference between the measured orientation and the target orientation are used to generate control signals. The control signals are used to control a drive system that moves the blade to minimize the error between the measured position and the target position and to minimize the error between the measured orientation and the target orientation.

The position and orientation of the blade are controlled by hydraulic cylinders. A valve controls the flow rate of hydraulic fluid, which, in turn, controls the velocity of a hydraulic cylinder (the velocity of the hydraulic cylinder refers to the time rate of change of the extension of the hydraulic cylinder). Valves can be manual or electric. For current automatic control systems, electric valves are used, and the control signals are electric signals that control the electric valves.

If a dozer is currently outfitted with manual valves, retrofitting the dozer with electric valves can be a complex, time-consuming, and expensive operation. In addition to modification of the valves, the hose connections to the pump, tank, and cylinder lines need to be disconnected and reconnected; retrofitting operations can take up to two days. As an added complication, in some instances, retrofitting an existing dozer may not be permitted by the manufacturer under terms of sale and may void the warranty for the dozer.

Even if the dozer is already outfitted with electric valves, the interface to the controller for the electric valves can be proprietary. The manufacturer of the dozer can restrict access to the interface specification needed by the construction contractor to install a custom automatic control system. And again, in some instances, retrofitting an existing dozer with an automatic control system not supplied by the manufacturer may not be permitted by the manufacturer under terms of sale and may void the warranty for the dozer.

Construction contractors can of course purchase dozers with electric valves and automatic control systems installed by the dozer manufacturer. In some instances, however, construction contractors lease or rent dozers, and the dozers available for lease or rent may not have suitable automatic control systems. Construction contractors may also wish to retrofit existing manually-controlled dozers with automatic control systems or to upgrade automatic control systems supplied by the dozer manufacturer with custom automatic control systems, which can have different capabilities or lower cost than the automatic control systems supplied by the dozer manufacturer.

BRIEF SUMMARY OF THE INVENTION

A joystick controls an implement operably coupled to a vehicle body: translation of the joystick controls at least one degree of freedom of the implement. According to an embodiment of the invention, a control system for automatically controlling the joystick includes an arm, an electrical motor assembly, at least one measurement unit, a computational system, and at least one driver.

The arm is operably coupled to the joystick, and the electrical motor assembly is operably coupled to the arm. At least one measurement unit is mounted on the vehicle body, on the implement, or on both the vehicle body and the implement. A measurement unit generates measurements corresponding to a degree of freedom.

The computational system receives the measurements and reference values of the degrees of freedom to be controlled.

Based on the measurements, the reference values, and a control algorithm, the computational system calculates error signals and corresponding control signals. The drivers receive the control signals and generate corresponding electrical drive signals. In response to receiving the electrical drive signals, the electrical motor assembly automatically controls the arm to translate along an automatically-controlled arm trajectory and the joystick to translate along an automatically-controlled joystick trajectory.

These and other advantages of the invention will be apparent to those of ordinary skill in the art by reference to the following detailed description and the accompanying drawings.

DETAILED DESCRIPTION

Embodiments of the invention described herein are applicable to automatic control systems for controlling the position and orientation of an implement mounted on a vehicle; the implement is operably coupled to the vehicle body. Examples of vehicles outfitted with an implement include a dozer outfitted with a blade, a motor grader outfitted with a blade, and a paver outfitted with a screed. In the detailed discussions below, a dozer outfitted with a blade is used to illustrate embodiments of the invention.

Figure 1A:
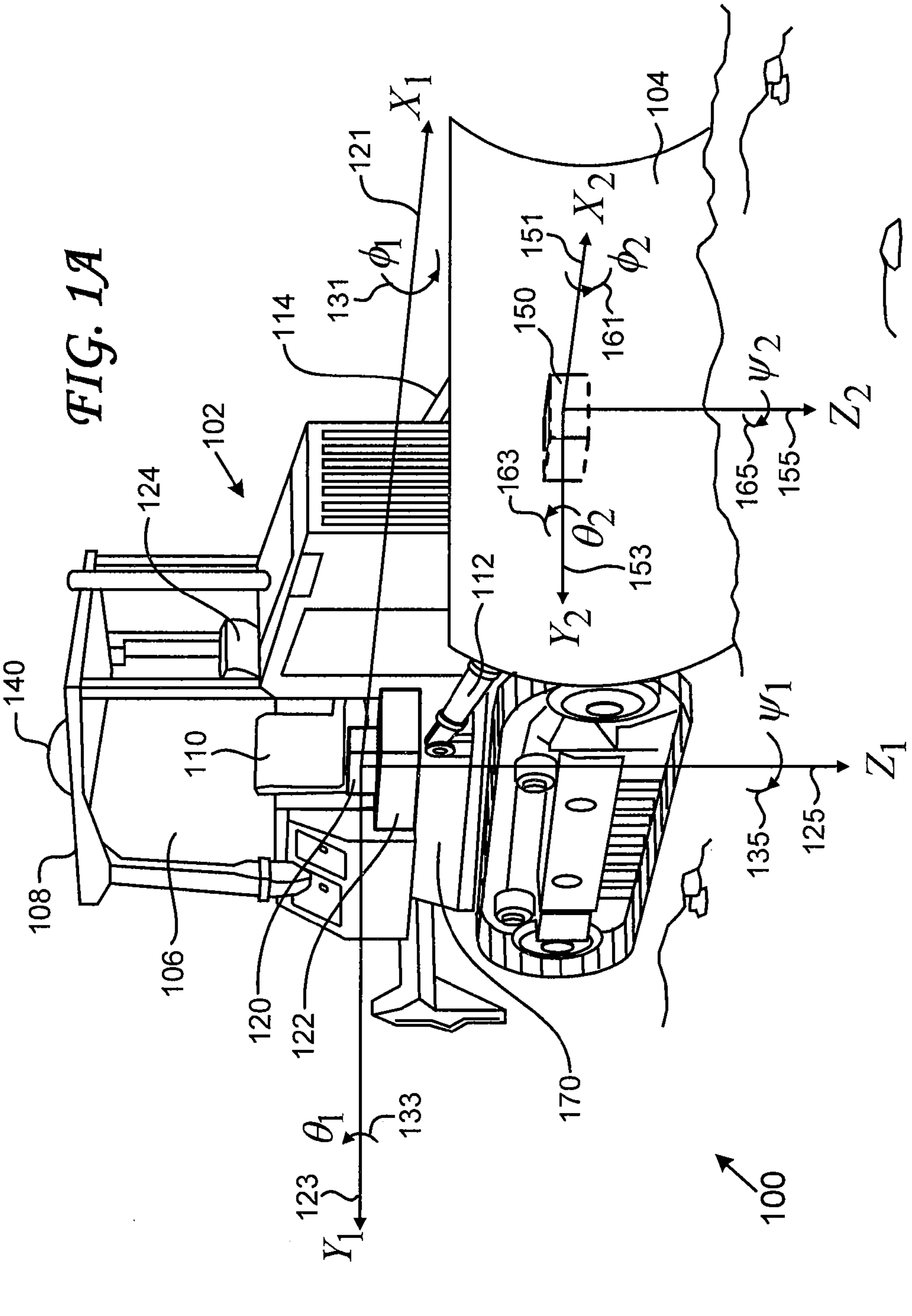
FIG. 1A shows a schematic of a dozer, a reference frame fixed to the dozer body, and a reference frame fixed to the blade.

FIG. 1A shows a schematic view of a dozer 100, which includes the dozer body 102 and the blade 104. The blade 104 is operably coupled to the dozer body 102 via hydraulic cylinders. The number of hydraulic cylinders depends on the dozer design. In one common configuration, a pair of hydraulic cylinders, referenced as the hydraulic cylinder 112 and the hydraulic cylinder 114, drives the blade 104 up and down; a separate hydraulic cylinder, not shown, rotates the blade to vary the blade slope angle.

Shown in FIG. 1A are two Cartesian coordinate systems (reference frames). The body coordinate system, fixed to the dozer body 102, is specified by three orthogonal coordinate axes: the $X_1$-axis 121, the $Y_1$-axis 123, and the $Z_1$-axis 125. Similarly, the blade coordinate system, fixed to the blade 104, is specified by three orthogonal coordinate axes: the $X_2$-axis 151, the $Y_2$-axis 153, and the $Z_2$-axis 155.

The rotation angle about each Cartesian coordinate axis follows the right-hand rule. Specific rotation angles are referenced as follows. In the body coordinate system, the rotation angle about the $X_1$-axis (body roll angle) is $\phi_1$ 131, the rotation angle about the $Y_1$-axis (body pitch angle) is $\theta_1$ 133, and the rotation angle about the $Z_1$-axis (body heading angle) is $\psi_1$ 135. Similarly, in the blade coordinate system, the rotation angle about the $X_2$-axis (blade roll angle) is $\phi_2$ 161, the rotation angle about the $Y_2$-axis (blade pitch angle) is $\theta_2$ 163, and the rotation angle about the $Z_2$-axis (blade heading angle) is $\psi_2$ 165.

Figure 1B:
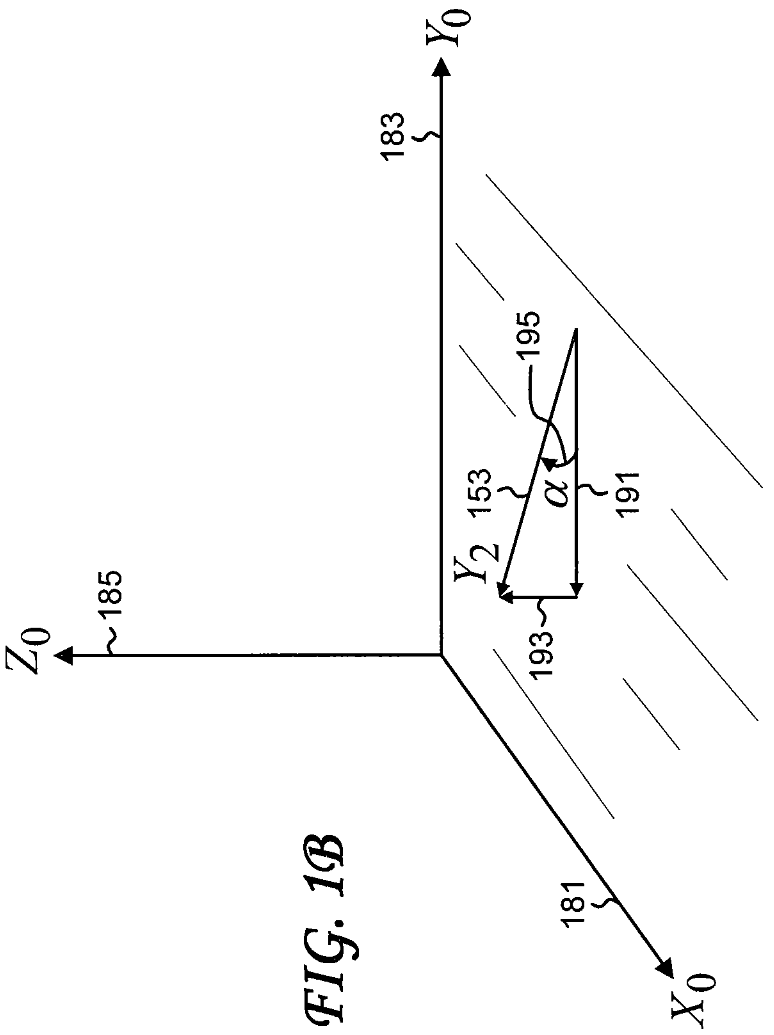
FIG. 1B shows a schematic of a reference frame fixed to the ground.

FIG. 1B shows a third coordinate system, fixed to the ground, specified by three orthogonal coordinate axes: the $X_0$-axis 181, the $Y_0$-axis 183, and the $Z_0$-axis 185. This coordinate system is sometimes referred to as a navigation coordinate system. The $X_0$-$Y_0$ plane serves as the local horizontal reference plane. The navigation coordinate system is typically specified by the site engineer. For example, the $X_0$-$Y_0$ plane can be tangent to the WGS 84 Earth ellipsoid.

Two blade parameters typically controlled during earthmoving operations are the blade elevation (also referred to as the blade height) and the blade slope angle. The blade elevation is the distance measured along the $Z_0$-axis between a reference point on the blade 104 and the $X_0$-$Y_0$ plane (or other reference plane parallel to the $X_0$-$Y_0$ plane). The blade slope angle is shown in FIG. 1B. The $Y_2$-axis 153 of the blade coordinate system is decomposed into a component 193 orthogonal to the $X_0$-$Y_0$ plane and a component 191 projected onto the $X_0$-$Y_0$ plane. The blade slope angle $\alpha$ 195 is the angle between the component 191 and the $Y_2$-axis 153.

Coordinates and angles specified in one reference frame can be transformed into coordinates and angles specified in another reference frame through well-known techniques, such as Euler angles or quaternions. For example, if the blade coordinate system is generated from the navigation coordinate system through the Euler angles (roll angle $\phi_2$ and pitch angle $\theta_2$), then the blade slope angle $\alpha$ is given by $$\alpha = a\tan\left(\frac{\sin(\phi_2)\cos(\theta_2)}{\sqrt{\cos^2(\phi_2) + \sin^2(\phi_2)\sin^2(\theta_2)}}\right).$$

Translations along coordinate axes and rotations about coordinate axes can be determined from measurements by various sensors. In an embodiment, two inertial measurement units (IMUs) are mounted on the dozer 100. Each IMU includes three orthogonally-mounted accelerometers and three orthogonally-mounted gyros. Depending on the degrees of freedom of the blade, an IMU can include fewer accelerometers and gyros; for example, one accelerometer and one gyro. Each accelerometer measures the acceleration along a coordinate axis, and each gyro measures the angular rate (time derivative of rotation angle) about a coordinate axis. In FIG. 1A, the IMU 120, fixed to the dozer body 102, measures the accelerations along the $(X_1, Y_1, Z_1)$-axes and the angular rates about the $(X_1, Y_1, Z_1)$-axes. Similarly, the IMU 150, fixed to the back of the blade 104, measures the accelerations along the $(X_2,Y_2,Z_2)$-axes and the angular rates about the $(X_2,Y_2,Z_2)$-axes. Control systems based on IMUs have been described in PCT International Application No. RU2012/000088 ("Estimation of the Relative Attitude and Position between a Vehicle Body and an Implement Operably Coupled to the Vehicle Body") and U.S. Patent Application Publication No. 2010/0299031 ("Semiautomatic Control of Earthmoving Machine Based on Attitude Measurement"), both of which are incorporated by reference herein. Other embodiments use a single IMU or more than two IMUs.

Herein, when geometrical conditions are specified, the geometrical conditions are satisfied within specified tolerances depending on available manufacturing tolerances and acceptable accuracy. For example, two axes are orthogonal if the angle between them is 90 deg within a specified tolerance; two axes are parallel if the angle between them is 0 deg within a specified tolerance; two lengths are equal if they are equal within a specified tolerance; and a straight line segment is a straight line segment if it is a straight line segment within a specified tolerance. Tolerances can be specified, for example, by a control engineer.

Other sensors can also be mounted on the dozer body or blade. For example, in FIG. 1A, a Global Navigation Satellite System (GNSS) sensor 140 is mounted on the roof 108 of the dozer cab 106. The GNSS sensor 140, for example, is an antenna electrically connected via a cable to a GNSS receiver (not shown) housed within the dozer cab 106. In some installations, the GNSS receiver is also mounted on the roof. The GNSS sensor 140 can be used to measure the absolute roof position in the WGS 84 coordinate system. The absolute blade position in the WGS 84 coordinate system can then be calculated from the absolute roof position and the relative position of the blade with respect to the roof based on measurements from the IMU 120 and the IMU 150 and based on known geometrical parameters of the dozer. In other configurations, the absolute position of the blade can be determined by a GNSS sensor (not shown) mounted on a mast fixed to the blade, as described in U.S. Patent Application Publication No. 2009/0069987 ("Automatic Blade Control System with Integrated Global Navigation Satellite System and Inertial Sensors"), which is incorporated by reference herein. When the GNSS sensor is mounted on the blade, the GNSS receiver can be installed either on the dozer body (for example, in the dozer cab) or on the blade.

Figure 2A:
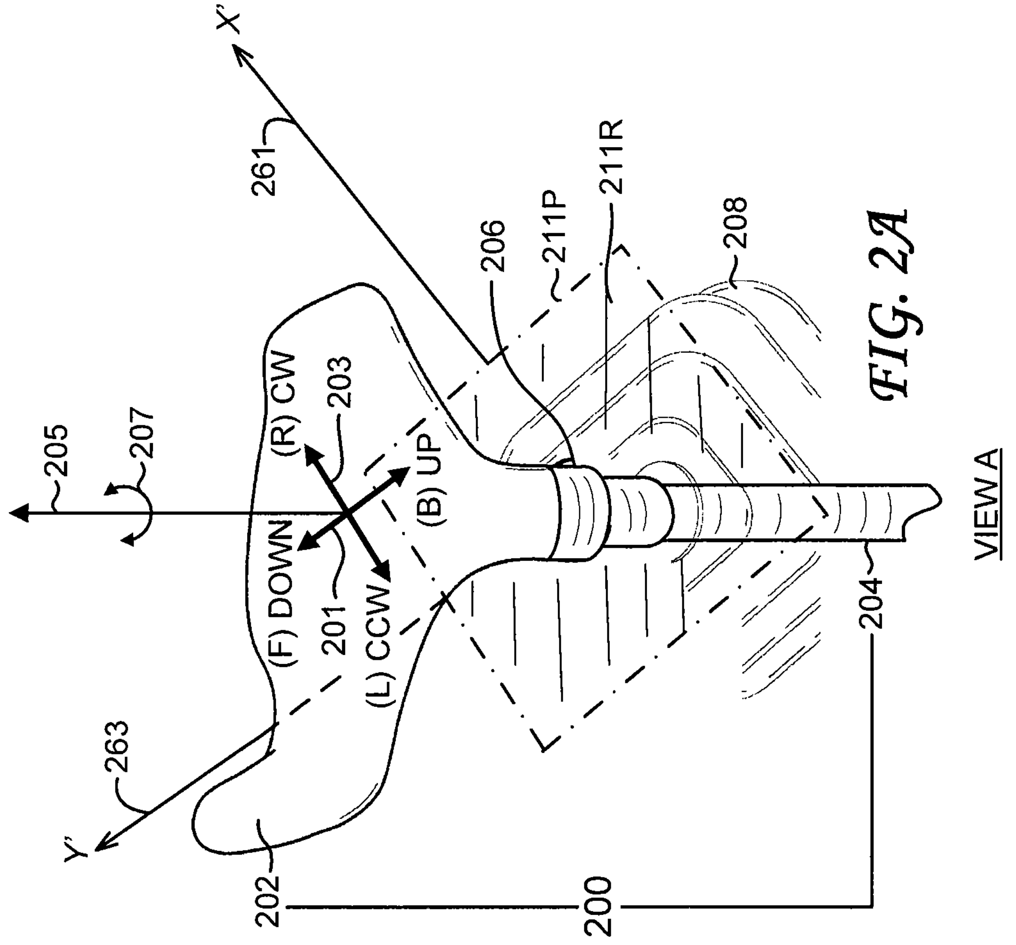
FIG. 2A shows a pictorial view of a joystick.

The dozer operator (not shown) sits on the operator's chair 110 within the dozer cab 106. FIG. 2A shows a pictorial view (View A) of a manual joystick for controlling the position and the orientation of the blade 104. The joystick 200 includes a joystick handle (joystick grip) 202 coupled to a joystick rod (joystick shaft) 204; also shown in FIG. 2A is a protective boot 208. In some designs, the joystick handle 202 is coupled to the joystick rod 204 via a clamp 206, and the joystick handle 202 can be detached from the joystick rod 204 by loosening the clamp 206. In other designs, the joystick handle 202 is permanently mounted to the joystick rod 204 and cannot be detached. Embodiments of the invention described below can accommodate both joysticks with handles that can be detached and joysticks with handles that cannot be detached.

Movement of the joystick 200 controls the hydraulic valves that control the hydraulic cylinders. As discussed above, the hydraulic valves can be mechanical valves or electric valves. A more detailed discussion of hydraulic control is provided below. The number of degrees of freedom of the joystick depends on the number of degrees of freedom of the blade. In some dozers, a blade can have a single degree of freedom (blade elevation). A 4-way blade has two degrees of freedom (blade elevation and blade slope angle). A 6-way blade has three degrees of freedom (blade elevation, blade slope angle, and blade heading angle).

Typical movement of a joystick for a 4-way blade is shown in FIG. 2A. The joystick 200 can be translated along the axis 201 and along the axis 203. From the perspective of the operator, the joystick 200 is translated forward (F)/backward (B) along the axis 201 and left (L)/right (R) along the axis 203. The axis 201 and the axis 203 are orthogonal. As discussed below, embodiments of the invention are not limited to translation axes that are orthogonal. The forward/backward translation of the joystick 200 is mapped to the down/up change in the blade elevation, and the left/right translation of the joystick 200 is mapped to the counter-clockwise (CCW)/clockwise (CW) change in the blade slope angle. For a 6-way blade, the joystick 200, in addition to forward/backward translation and left/right translation, can be rotated about the central (longitudinal) axis 205 of the joystick through a rotation angle 207. Rotation of the joystick 200 about the central axis 205 is mapped to rotation of the blade about the blade's vertical axis.

The mapping described above between the translation and the rotation of the joystick and the translation and the rotation of the blade is one option. In general, other mappings between the translation and the rotation of the joystick and the translation and the rotation of the blade can be used.

For manual blade control, an operator grips the handle 202 with his hand and continuously moves the joystick forward/backward and left/right. Rotation about the central axis 205 is used typically only at the beginning of the current swath. The operator sets the desired push-off angle to move ground to the side from the swath. In general, movement of the joystick is not restricted to sequential translations along the axis 201 and the axis 203; for example, the joystick can be moved diagonally to change the blade elevation and the blade slope angle simultaneously. The joystick is returned back to the vertical position by an internal spring (not shown) with a reflexive (resistive) force of about 2 to 3 kg. The vertical position typically corresponds to no change in the blade elevation and no change in the blade slope angle.

The geometry described above is that viewed from the perspective of the operator. A more detailed description of the operational geometry of the joystick is shown in the schematic diagrams of FIG. 2B-FIG. 2E.

Figures 2B, 2C, 2D, 2E:
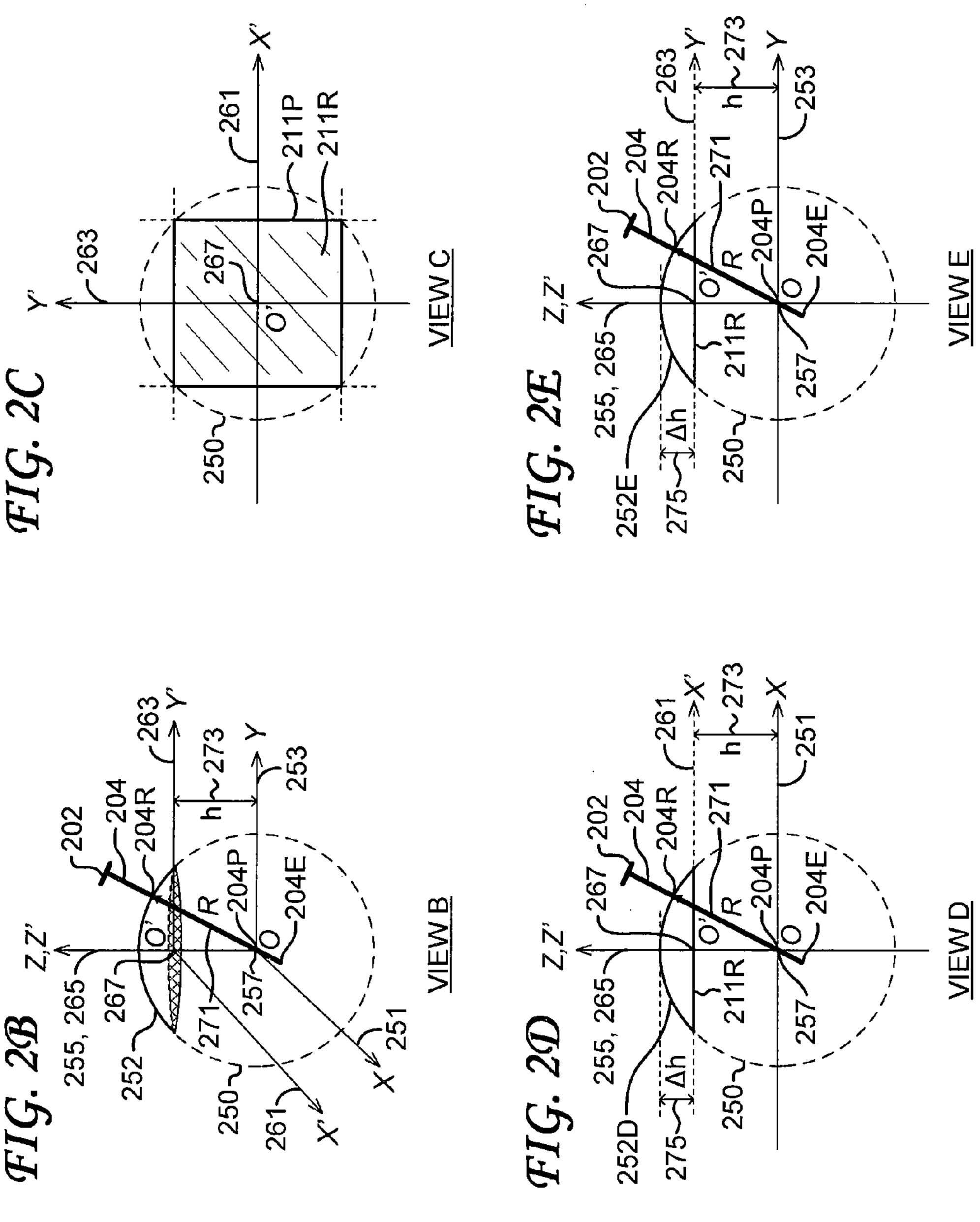
FIG. 2B-FIG. 2E show schematics of the operational geometry of a joystick.

FIG. 2B shows a perspective view (View B). Shown is a Cartesian coordinate system defined by the X-axis 251, the Y-axis 253, the Z-axis 255, and the origin O 257. Shown are various reference points along the joystick rod 204. The reference point 204P is placed at the origin O. The reference point 204R is placed at a radius R 271 from the reference point 204P. In operation, the joystick 204 pivots about the reference point 204P. The reference point 204R therefore moves along a portion of the surface of the sphere 250. The portion of the surface of the sphere 250 that can be traced out by the reference point 204R is shown as the surface 252.

For mechanical valves, the joystick rod 204 can be coupled to a Cardan joint, and the reference point 204E (marking the end of the joystick rod 204) is placed on the Cardan joint. A mechanical assembly links the Cardan joint to the hydraulic valves. Movement of the joystick controls the hydraulic valves via the Cardan joint and the mechanically assembly. For electric valves, the joystick rod 204 can be coupled to potentiometers, and the reference point 204E is placed on a coupling assembly. Movement of the joystick controls the settings of the potentiometers, which in turn controls the current or voltage to the electric valves.

Also shown in FIG. 2B is a second Cartesian coordinate system, defined by the X'-axis 261, the Y'-axis 263, the Z'-axis 265, and the origin O' 267. The Z'-axis is coincident with the Z-axis, the X'-Y' plane is parallel to the X-Y plane, and the origin O' is displaced from the origin O by the height h 273.

FIG. 2C shows an orthogonal projection view (View C) sighted along the (−Z, −Z')-axis onto the X'-Y' plane. The projection of the surface 252 (FIG. 2B) is shown as the region 211R bounded by the perimeter 211P. In the example shown, the region 211R is a square. In general, the region 211R can have various geometries.

The X'-Y' plane, the region 211R, and the perimeter 211P is also shown in FIG. 2A. In an embodiment, the region 211R of the translation (also referred to as displacement or stroke) of the joystick has an approximately square shape with a size of about 60×60 mm (referenced at approximately the level of the clamp 206). In general, the joystick can be moved directly from a first point in the region 211R to a second point in the region 211R.

FIG. 2D shows a cross-sectional view (View D). The plane of the figure is the X-Z plane. In this example, the reference point 204R traces the arc 252D. Note that the height of the reference point 204R above the X' axis can vary from 0 to Δh 275 (measured along the Z-axis).

FIG. 2E shows a second cross-sectional view (View E). The plane of the figure is the Y-Z plane. In this example, the reference point 204R traces the arc 252E. Note that the height of the reference point 204R above the Y'-axis can vary from 0 to Δh 275 (measured along the Z-axis).

Figure 3:
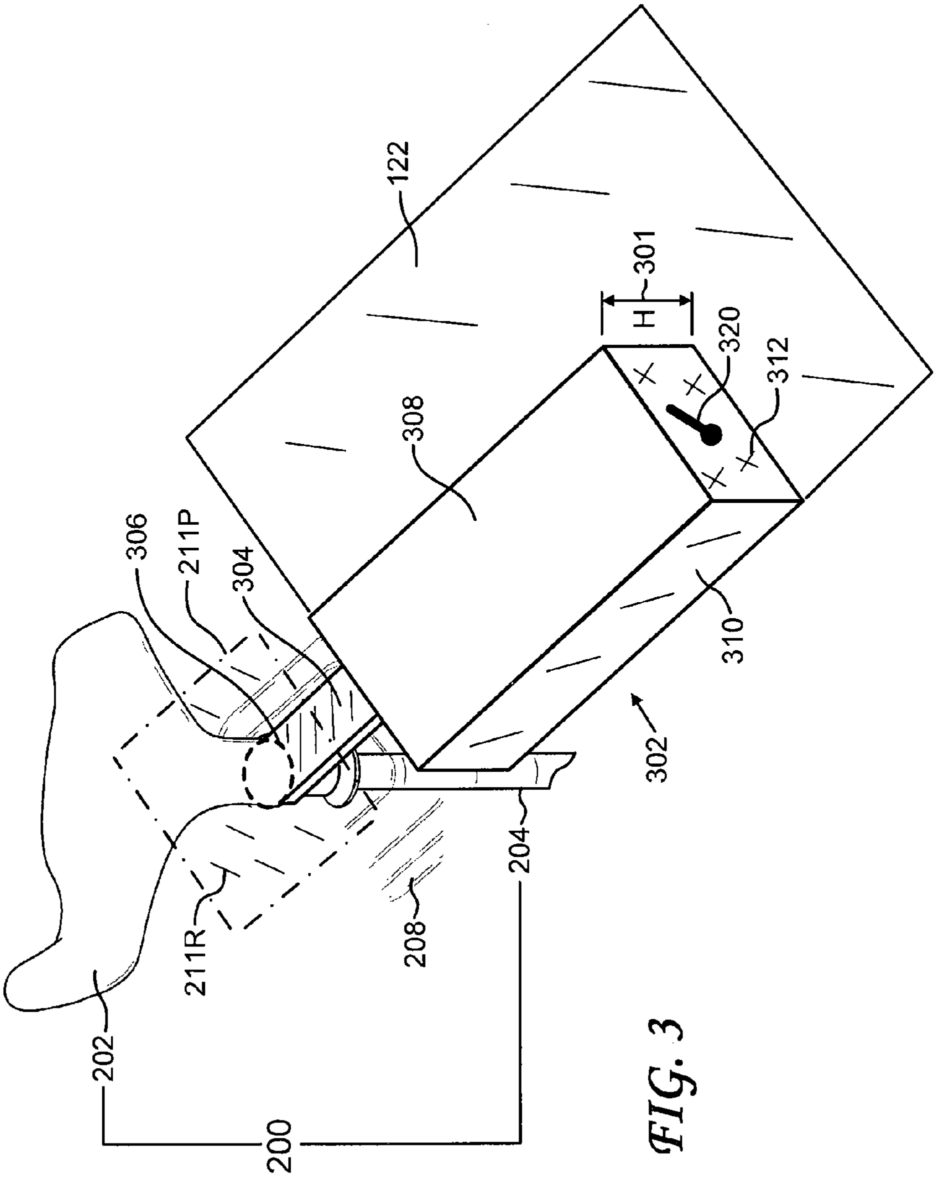
FIG. 3 shows a schematic of an electrical actuator coupled to a joystick.

In an embodiment of the invention, automatic blade control is implemented with an electrical actuator unit coupled to the joystick 200. Refer to FIG. 3. The electrical actuator unit 302 has a motor-driven arm 304 that is flexibly coupled to the joystick 200 via a coupling 306, which is positioned near the clamp 206 (FIG. 2). The coupling 306 permits the electrical actuator unit 302 to be readily attached to and detached from the joystick 200. Details of the arm 304, the coupling 306, and motors are described below.

Due to space constraints in the dozer cab 106 (FIG. 1A), the electrical actuator unit 302 is advantageously located in a specific region to maintain the convenience and comfort of the operator: in the area of the rear side of the joystick 200, as referenced from the viewpoint of the operator sitting in the operator's chair 110. This area is located under the right armrest (not shown) of the operator's chair 110 and over the top surface of the shelf 122. In typical dozers, the shelf 122 is installed at a standard height from the floor, and the armrest is mounted on the side of the shelf 122. The height of the armrest above the top surface of the shelf 122 is adjustable over a suitable range for the comfort of the operator.

Return to FIG. 3. The motors and control electronics, described below, of the electrical actuator unit 302 are housed in a case 310. An important parameter is the height H 301 of the case 310. To maintain operator comfort and convenience while controlling the joystick 200 in the manual mode when needed, the height H should have a maximum value determined by the maximum height of the armrest. A typical value of height H is about 100 mm. In an embodiment, the top surface of the case 310 is covered with a soft mat 308, which can then serve as an armrest. The standard armrest can be removed if necessary, and the case 310 can be rigidly mounted to the shelf 122. The case 310 can also be installed with an angle bracket attached to the mounting holes used for mounting the armrest, once the armrest has been removed.

In the automatic control mode, the arm 304 moves the joystick 200. The electrical actuator unit 302 has two active degrees of freedom to override the spring reflexive force and to translate the joystick 200 over the region 211R [the reference point 204R (FIG. 2B) is placed near the position of the clamp 206 (FIG. 2A)]. Even with the electrical actuator unit installed, however, it is necessary to allow blade operation in manual mode: when the electrical actuator unit is turned off, it should provide a minimum resistance to joystick movement by the operator's hand. A worm gear or a gear with a large conversion ratio, therefore, is not suitable to be used in the electrical actuator unit; a direct drive motor is advantageous for this task. Details of suitable motor assemblies are discussed below.

As discussed above, the joystick pivots about a pivot point; consequently, the absolute height of the clamp 206 varies as a function of joystick displacement (see FIG. 2D and FIG. 2E). Therefore, the electrical actuator unit 302 should have one more passive degree of freedom to track changes in clamp height. In addition, for a 6-way blade, the electrical actuator unit 302 should also allow the operator to manually rotate the joystick 200 about its central axis 205. The electrical actuator unit 302, therefore, should have in total four degrees of freedom: two active degrees and two passive degrees. An active degree of freedom refers to a degree of freedom that moves the blade and consumes energy (such as electrical energy), and a passive degree of freedom refers to a degree of freedom that does not move the blade, but allows proper positioning, coupling, and manual operation of the joystick. In practice, active degrees of freedom should allow movement of the joystick 200 with millimeter accuracy to provide accurate control of the velocity of the hydraulic cylinders. In general, the number of active degrees of freedom and the number of passive degrees of freedom can be specified according to the number of degrees of freedom of the blade and according to the design and operation of the joystick.

Return to FIG. 3. To allow the operator to choose an operating mode [automatic (auto) or manual (man)], there is a two-position switch, auto/man switch 320, that is operated by the operator to turn on-and-off the automatic control. The auto/man switch 320 can be located in various positions. In the embodiment shown in FIG. 3, the auto/man switch 320 is positioned on the rear face 312 of the case 310. The auto/man switch 320 can also be positioned away from the case 310; for example, on the shelf 122. This switch is a component of a user interface, described in more detail below.

Additionally, for safe operation, the electrical actuator unit 302 supports operator reflex override intervention to take the system under human control in a critical situation, without the need to operate the auto/man switch 320. Emergency manual override can be necessary, for example, if the blade becomes buried under a very high load. Emergency manual override can also be necessary if the dozer is static and the automatic mode is activated by mistake. If the dozer is static, the blade cannot dig ground, and the blade will start to lift up the dozer body. When the control system is operating in the auto mode, the operator can disengage the auto control simply by gripping the joystick and moving it. Manual intervention overrides the auto control and moves the blade up or down as needed in specific instances. In an embodiment, the electrical actuator unit 302 continuously monitors drive current to the motors and turns off power in the event of an overcurrent condition resulting from manual override of the joystick (see further details below).

Figure 4A:
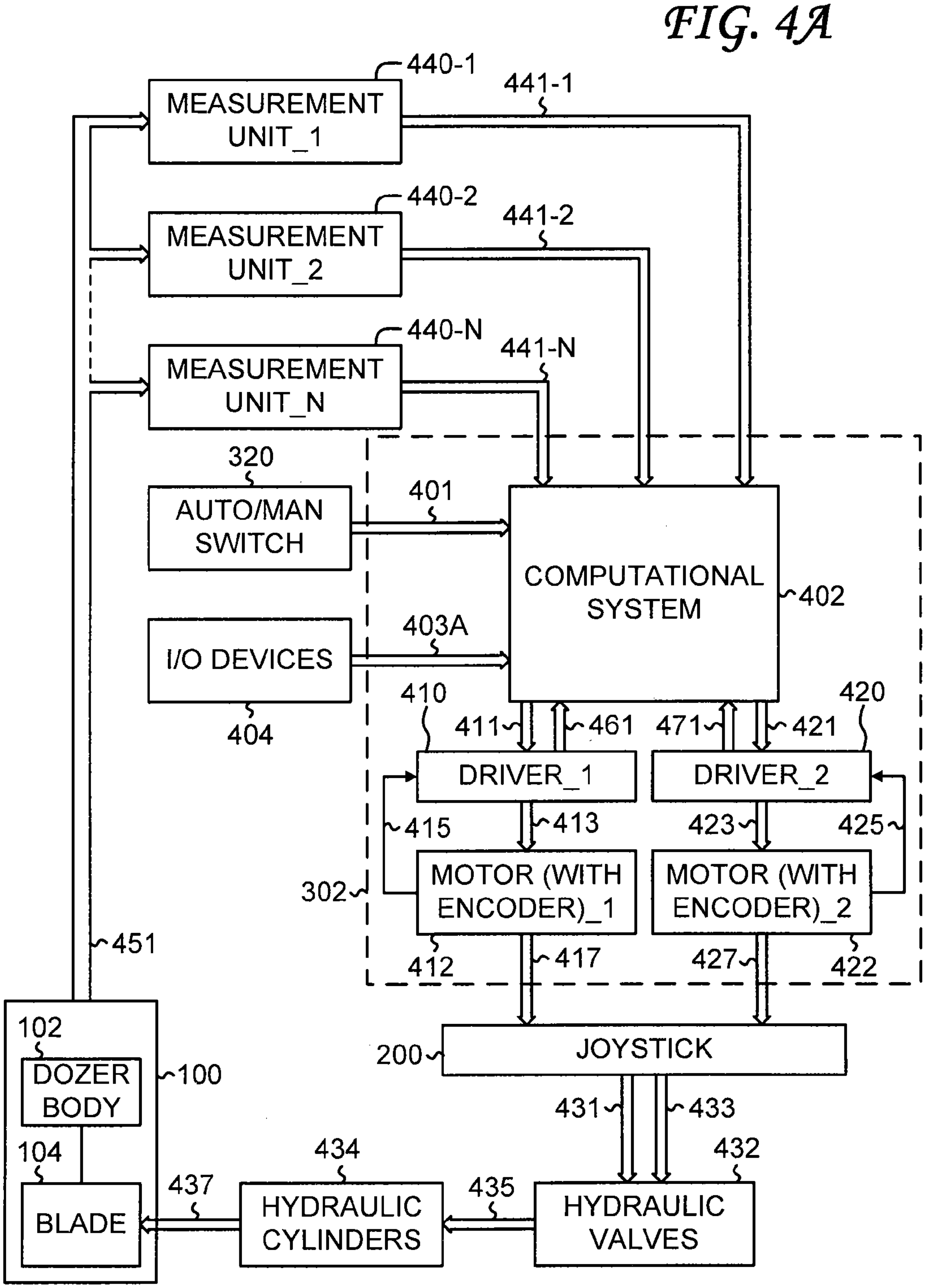
FIG. 4A-FIG. 4C show schematics of different embodiments of automatic control systems.

FIG. 4A shows a schematic block diagram of an automatic control system, according to an embodiment of the invention. The automatic control system is a closed feedback system that corrects for dynamic and static impacts on the system and for measurement errors. Dynamic impact appears in the system from the outside world only during machine and blade movement, but static impact is present during any condition. Reaction force from the ground to change of body position is an example of dynamic impact, while blade weight is an example of static force (static impact).

The electrical actuator unit 302 receives inputs from the auto/man switch 320, one or more input/output (I/O) devices 404, and one or more measurement units (described below). The electrical actuator 302 receives the switch state status signal 401 (auto or man) from the auto/man switch 320. The electrical actuator 302 receives the input 403A from the I/O devices 404. The input 403A includes a set of reference values that specify the target (desired) values of the position and the orientation of the blade. The I/O devices 404 are discussed in more detail below; an example of an I/O device is a keypad.

Sets of measurements are generated by one or more measurement units; a measurement unit includes one or more sensors and associated hardware, firmware, and software to process signals from the sensors and generate measurements in the form of digital data. The measurement units can be mounted on the dozer body 102 or the blade 104 (FIG. 1A). Specific examples of measurement units and specific placement of measurement units are discussed below. In general, there are N measurement units, where N is an integer greater than or equal to one. In FIG. 4A, the measurement units are referenced as measurement unit_1 440-1, measurement unit_2 440-2, . . . , measurement unit_N 440-N, which output measurements_1 441-1, measurements_2 441-2, . . . , measurements_N 441-N, respectively. In general, the components and configuration of each measurement unit and the set of measurements outputted by each measurement unit can be different.

Inputs 451 to the measurement units represent the position and orientation state of the dozer 100, including the position and orientation state of the dozer body 102, the blade 104, and other components (such as extensions of hydraulic cylinders). The dozer 100 and various components, including the hydraulic cylinders 434, the hydraulic valves 432, and the joystick 200 are subject to dynamic and static impacts. The measurements are also subject to measurement errors. Measurement errors can result from various causes, including the effect of electrical noise on certain sensors and the effects of temperature, shock, and vibration on certain sensors.

In the electrical actuator unit 302, the computational system 402 filters the sets of input measurements to compensate for measurement errors and calculates estimates of the position and orientation of the blade. Various filters, such as Kalman filters and extended Kalman filters, can be used to fuse the various sets of measurements. The filtering and calculation steps performed by the computational system 402 are specified by a control algorithm stored in the computational system 402. The control algorithm, for example, can be entered via the I/O devices 404 by a control engineer during installation of the automatic control system. The control algorithm depends on the type, number, and placement of the measurement units installed and on the degrees of freedom to be controlled. Details of an embodiment of the computational system 402 are discussed below.

The computational system 402 then calculates error signals from the differences between the calculated estimates and the reference values (included in the input 403A). From the error signals, the computational system 402 calculates corresponding control signals according to the control algorithm.

Figure 8:
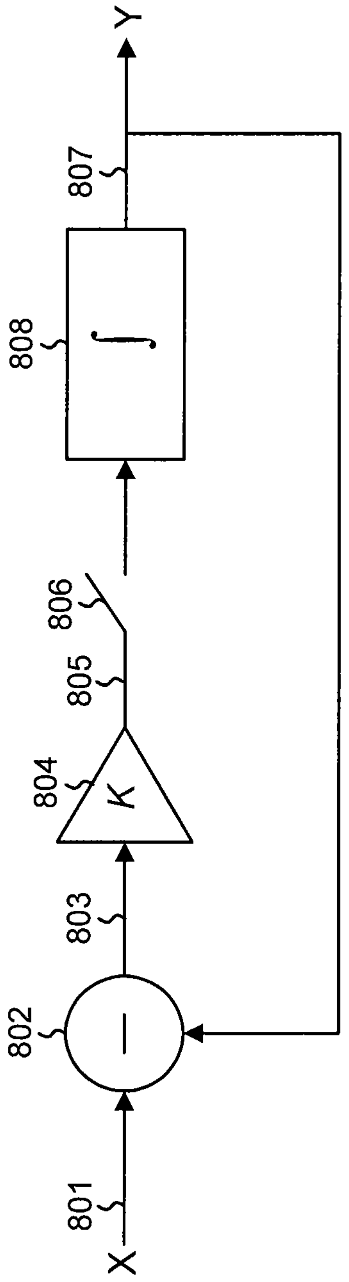
FIG. 8 shows a schematic of a control algorithm.

FIG. 8 shows a schematic of a basic control algorithm implementing a proportional (P) controller. The input signal X 801 is a reference signal which puts the system in the desired condition defined by the output signal Y 807. The subtraction unit 802 receives the input signal X and the output signal Y and calculates the difference X-Y. The difference signal 803 is then inputted into the amplifier 804, which multiplies the difference signal 803 by the gain factor K. The gain factor K is a tunable parameter; its value is specified based on the desired bandwidth of the system, measurement noise, dynamic and static impacts, and inherent gain factors of components inside the control loop. The output signal 805 is inputted into the switch 806, which is open in the manual mode and closed in the automatic mode. In the automatic mode, the output signal 805 is inputted into the integrator 808. The output of the integrator 808 is the output signal Y 807. More complex control algorithms can be specified and entered into the computational system 402. Control algorithms are well-known in the art; further details are not described herein.

Return to FIG. 4A. The driver_1 410 receives the control signal 411 and generates the drive signal 413, which represents an electrical voltage or current that drives the motor_1 412. Similarly, the driver_2 420 receives the control signal 421 and generates the drive signal 423, which represents an electrical voltage or current that drives the motor_2 422. The driver_1 410 transmits the output signal 461, which represents the value of the drive signal 413, back to the computational system 402; similarly, the driver_2 420 transmits the output signal 471, which represents the value of the drive signal 423, back to the computational system 402. The output signal 461 and the output signal 471, for example, can represent the values of the drive currents in amps. The computational system 402 monitors the output signal 461 and the output signal 471 to determine an overdrive condition. For example, if the output signal 461 exceeds a specific threshold value or if the output signal 471 exceeds a specific threshold value, the computational system 402 can disable the automatic mode, and the control system will revert to manual mode. The specific threshold values can be set, for example, by a control engineer during installation of the automatic control system.

The motor_1 412 is outfitted with an encoder that estimates the position of the motor shaft and transmits a feedback signal 415 containing the position estimates back to the driver_1 410. Similarly, the motor_2 422 is outfitted with an encoder that estimates the position of the motor shaft and transmits a feedback signal 425 containing the position estimates back to the driver_2 420. If the motor is a stepper motor, an encoder is not needed; a reference home position of the shaft is stored, and the position of the shaft is determined by the number of steps from the home position.

A driver can be implemented by different means; for example, by a single integrated circuit or by a multi-component printed circuit board. A driver can be embedded into a motor. In general, the driver depends on the specific type of motor and specific type of encoder.

As described below, the motors control the joystick stroke. The joystick stroke unambiguously depends on the position of the motor shafts. Local feedback allows unambiguous conversion of digital code (in the control signals) to position, improves the response time of the electrical actuator, and compensates for negative effects from dynamic and static impacts. Efficient compensation can be applied for nonlinear dependency (include dead band) of the blade velocity versus joystick stroke for a particular combination of motors, hydraulic valves, and hydraulic cylinders. To achieve the desired compensation, a calibration procedure is run on the dozer after the electrical actuator has been installed.

The motor_1 412 and the motor_2 422 can translate the arm 304 (FIG. 3), which, in turn, can translate the joystick 200. The motor_1 412 causes translation 417; similarly the motor_2 422 causes translation 427. The combination of the motor_1 412 and the motor_2 422 provides two active degrees of freedom, which allows movement of the joystick 200 over the region 211R (FIG. 3) to control the elevation and slope channels. Independent control of these channels is desirable: each motor controls a separate channel. For example, the motor_1 412 can control elevation, and the motor_2 422 can control slope.

Independent control can be achieved when the force vectors from the motors are orthogonal to each other. Refer to FIG. 2A. One force vector should be coincident with the joystick down/up axis 201, and the other force vector should be coincident with the joystick CCW/CW axis 203. This feature also saves power and increases the service life of the motors by minimizing the number of motor operational switching cycles. Typically, the slope channel requires a lower switching rate than the elevation channel because of the natural dynamics of the dozer.

Return to FIG. 4A. Translation of the joystick 200 generates two outputs, referenced as output 431 and output 433. The output 431 and the output 433 change the position of the spools in the hydraulic valves 432; the changes in the positions of the spools in turn change the flow rate of the hydraulic fluid 435 that moves the hydraulic cylinders 434. For manual valves, the joystick 200 can be operably coupled to the valves via a mechanical linkage. For electric valves, the joystick 200 can be operably coupled to potentiometers or other electrical devices that control the voltage or current to the valves.

The hydraulic cylinders 434 exert forces 437 on the blade 104 and change the position and the orientation of the blade 104. The hydraulic cylinders 434 therefore change the configuration of the dozer 100: the mutual position and orientation of the blade 104 and the dozer body 102. The measurement units sense this change and provide information for further processing. The desired closed feedback loop is thus completed.

Figure 4B:
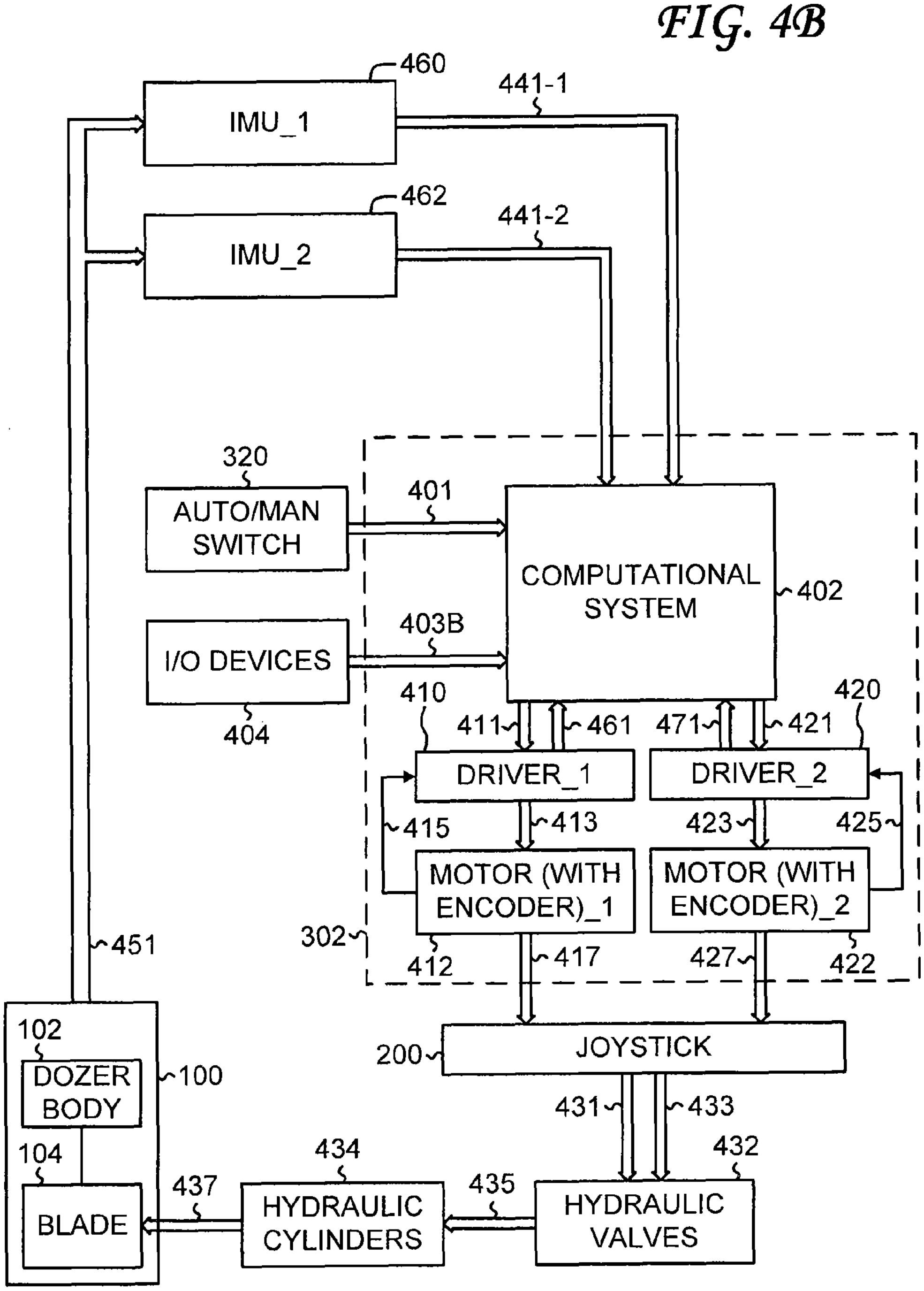
Figure 4C:
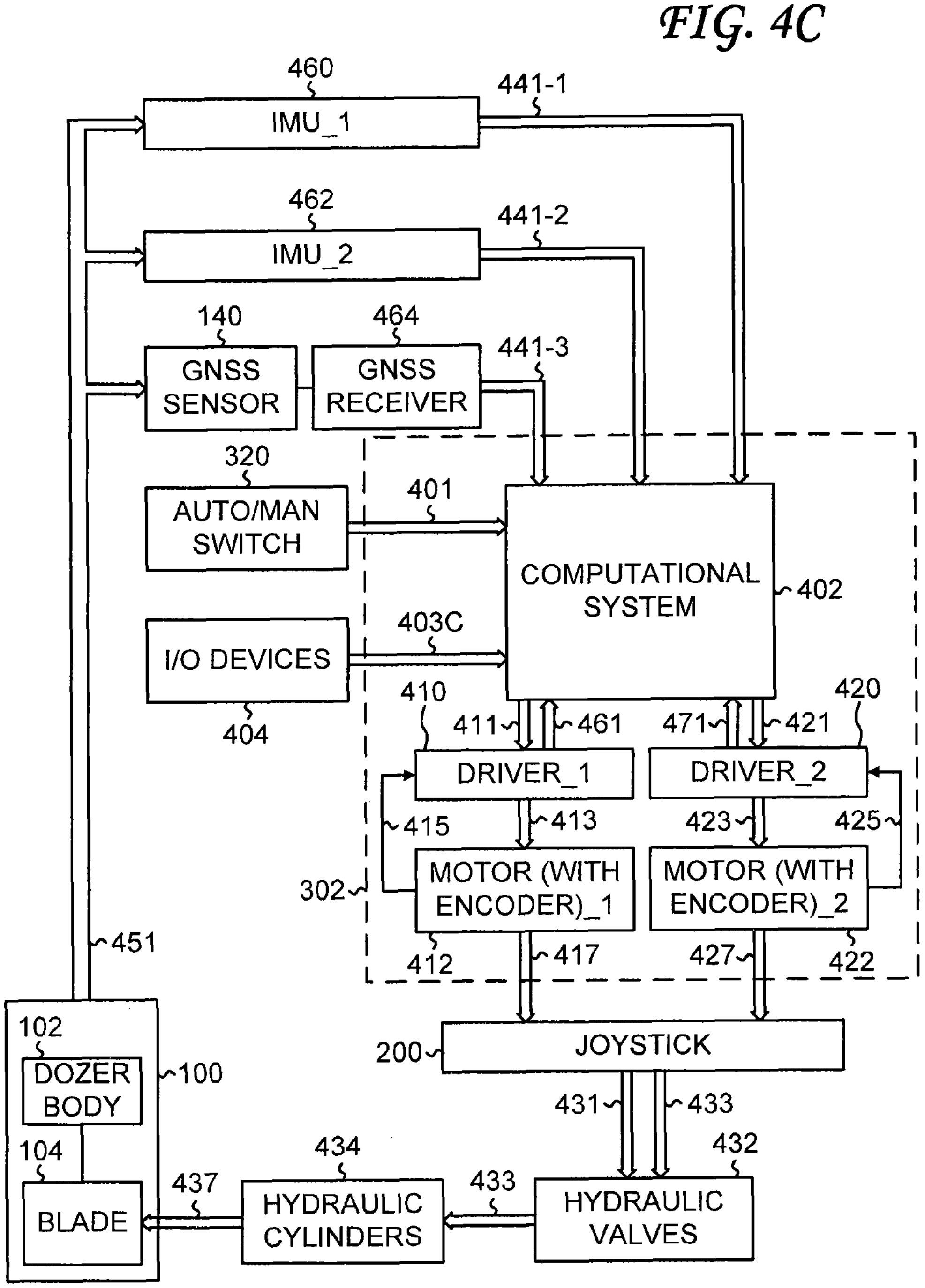

FIG. 4B and FIG. 4C show embodiments of automatic control systems with particular types and configurations of measurement units.

FIG. 4B shows a schematic block diagram of an embodiment of an automatic control system with two inertial measurement units (IMUs). In this embodiment, the first IMU, referenced as IMU_1 460, is mounted within the case 310 (FIG. 3) of the electrical actuator unit 302, which, as discussed above, is mounted in the dozer cab 106 (FIG. 1A). The IMU_1 460 can correspond to the IMU 120 in FIG. 1A. The second IMU, referenced as IMU_2 462, is mounted on the blade 104 and can correspond to the IMU 150 in FIG. 1A. The input 403B, including specific reference values, is entered into the computational system 402. The computational system 402 receives the measurements 441-1 from the IMU_1 460 and the measurements 441-2 from the IMU_2 462, filters the measurements, and calculates an estimate of the body pitch angle $\theta_1$ 133, an estimate of the body roll angle $\phi_1$ 131 (FIG. 1A), and the mutual body-blade position. The computational system 402 calculates error signals by comparing the calculated values of the body pitch angle and the body roll angle with the reference values, taking into account the mutual body-blade position. Control of the joystick 200 then proceeds as discussed above in reference to FIG. 4A. This automatic control system works as a pitch and roll stabilization system (see PCT International Application No. RU 2012/000088, previously cited).

According to another embodiment, the IMU_1 460 is not mounted within the case 310 of the electrical actuator 302. Instead, the IMU_1 460 is mounted to the dozer main frame 170 (FIG. 1A). In some dozers, the dozer cab 106 can have a suspension system (such as rubber blocks) for operator comfort; this suspension system separates the dozer cab and the dozer main frame. The changes in position and orientation of the electrical actuator unit 302 can therefore differ from those of the dozer main frame 170; that is, the values of the body pitch angle and the body roll angle can vary as a function of the specific location on the dozer body 102 on which the IMU is mounted. The resonance frequency of the electrical actuator unit can also differ from that of the dozer main frame. The effect of shock and vibration on the IMU varies with the resonance frequency; shock and vibration can result in incorrect pitch and roll estimations. Mounting the IMU_1 460 on the dozer main frame 170 reduces errors in the resulting ground profile because the blade 104 is coupled via the hydraulic cylinders to the dozer main frame 170, which, along with the chassis and tracks, rests on the ground.

In some dozers, only the operator's chair has a suspension; the dozer cab is rigidly mounted to the dozer main frame. For these dozers, installing the IMU_1 460 within the case 310 of the electrical actuator 302 can provide a less complex, less expensive, more convenient, and more compact solution than installing the IMU_1 460 separately on the dozer main frame. Since the dozer cab is rigidly mounted to the dozer main frame, an acceptable degree of accuracy can be achieved.

FIG. 4C shows a schematic block diagram of an embodiment of an automatic control system with two inertial measurement units (IMUs) and a GNSS sensor (antenna) and GNSS receiver (see PCT International Application No. RU 2012/000088, previously cited). A GNSS sensor and GNSS receiver combined correspond to a measurement unit. The IMUs are the same as those discussed above in reference to FIG. 4B. A GNSS sensor 140 (antenna) is mounted on the roof 108 of the dozer cab 106 (FIG. 1A). Satellite signals received by the GNSS sensor 140 are processed by a GNSS receiver 464, which can be located, for example, within the dozer cab 106 or on the roof 108. The GNSS receiver 464 can provide centimeter-level accuracy of the coordinates of the GNSS sensor 140. These coordinates are included as measurements 441-3. The input 403C, including specific reference values, is entered into the computational system 402.

The computational system 402 receives the measurements 441-1 from the IMU_1 460, the measurements 441-2 from the IMU_2 462, and the measurements 441-3 from the GNSS receiver 464. The computational system 402 executes algorithms based on a Kalman filter approach and determines accurate three-dimensional (3D) coordinates of the blade. The embodiment shown in FIG. 4C eliminates any drift associated with elevation control in the embodiment shown in FIG. 4B. The computational system 402 calculates error signals by comparing the calculated values of the 3D blade coordinates and the blade roll angle with the reference values. Control of the joystick 200 then proceeds as discussed above in reference to FIG. 4A.

In an embodiment, automatic/manual control mode of the elevation channel and the slope channel can be set independently; there are four combinations of control modes for elevation channel/slope channel control: manual/manual, automatic/automatic, automatic/manual, and manual/automatic. Manual control of both the elevation channel and the slope channel can be enabled by default, and automatic control of both the elevation channel and the slope channel can be enabled when desired. Depending on operating conditions, the operator can enable automatic control of the elevation channel only and control the slope manually with the joystick. Similarly, the operator can enable automatic control of the slope channel only and control the elevation manually with the joystick.

The control options depend on the desired applications and the configuration of measurement units. For example, with the automatic control system based on two IMUs shown in FIG. 4B, the absolute blade slope is estimated and used for automatic slope control; the elevation can be controlled manually or automatically. In other applications, only one IMU is used: the IMU_1 460 is not installed on the dozer body, only the IMU_2 462 is installed on the blade. The IMU_2 462 provides estimates of the absolute blade slope, which is used only for automatic slope control. Only one motor is installed for automatic control of the slope channel; elevation control is manual only.

Different schemes can be used for automatic elevation control. The choice can depend on operator preference. In one method, suitable for short-term adjustments, the operator returns the blade to a desired profile based on visual marks (for example, stakes, string, or a neighboring swath). The system first changes the elevation of the blade according to operator manual intervention; after the operator releases manual control, the system regains full automatic control of the elevation channel.

Another method, as described in US Patent Application Publication No. US 2010/0299031, previously cited, implements control via shifting a control point. The control point is a virtual point on the bottom surface of the dozer track that defines the condition under which the dozer configuration is in a state of equilibrium. In the case of an unloaded dozer, the control point is the bottom projection of the machine center of gravity. During machine operation, the equilibrium point changes its position due to the influence of external forces. The control point is then adjusted manually by the operator.

Various means can be used for providing operator input to the control system. For example, input devices can include equipment (such as an additional electrical joystick, a dial, or slider switches) that control changes in the blade elevation or the control point position. This configuration has general applicability. In general, input devices can include both the I/O devices 404 operably coupled to the computational system 402 and input devices not operably coupled to the computational system 402.

In an embodiment, input devices can be positioned on the case 310 of the electrical actuator unit 302 (FIG. 3) or on the shelf 122. The input devices can include a keyboard (for example, a film or button type) and indicators [for example, light-emitting diode (LED) or liquid-crystal display (LCD)] to allow the operator or control engineer to setup various aspects of the system. Setup parameters include, for example, dozer geometry, IMUs mounting offsets calibration, reference pitch and roll settings (these can be entered by buffering the current ones or entered via the keyboard), actuator nonlinearity calibration (include dead band), selection of elevation adjustment mode (automatic/manual), and selection of slope adjustment mode (automatic/manual). A convenient and general implementation can also use the display 124 (FIG. 1A), with an integrated keyboard or touchscreen, placed on the gauge board of the machine or integrated into it.

If the operator needs to perform only short-term manual blade elevation adjustment, for example, he can use the joystick 200 as usual. Under these circumstances, however, there can be some inconvenience for him because the joystick is still in the automatic mode; that is, the joystick is continuously moved by the electrical actuator, and the operator needs to override motors. The operator should be able to override the electrical actuator gently, without excessive force, to disengage the automatic control system. Suitable motor assemblies that readily accommodate manual override are described below.

Figure 5:
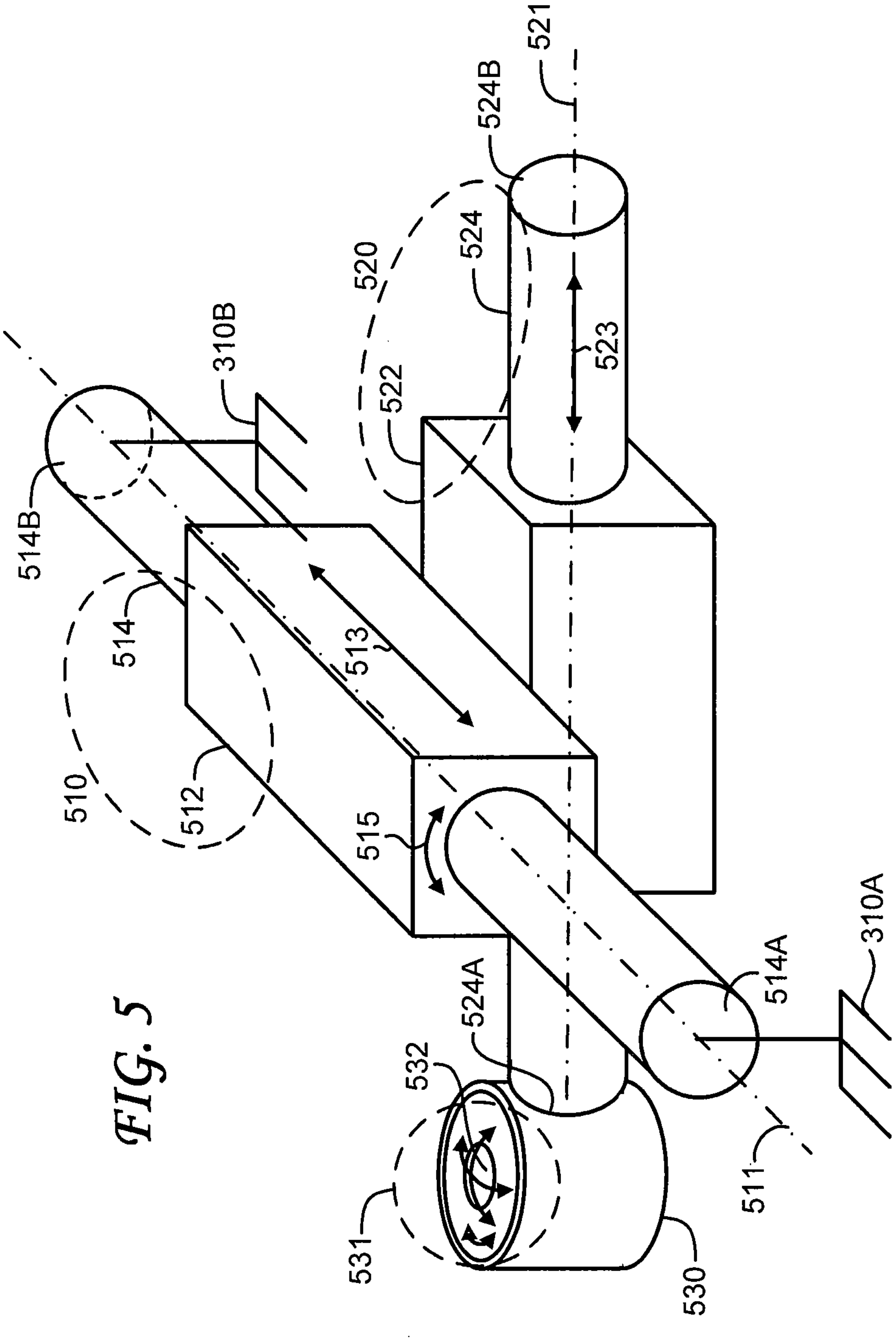
FIG. 5 shows a schematic of a first embodiment of drive motors used in an electrical actuator.
Figure 6:
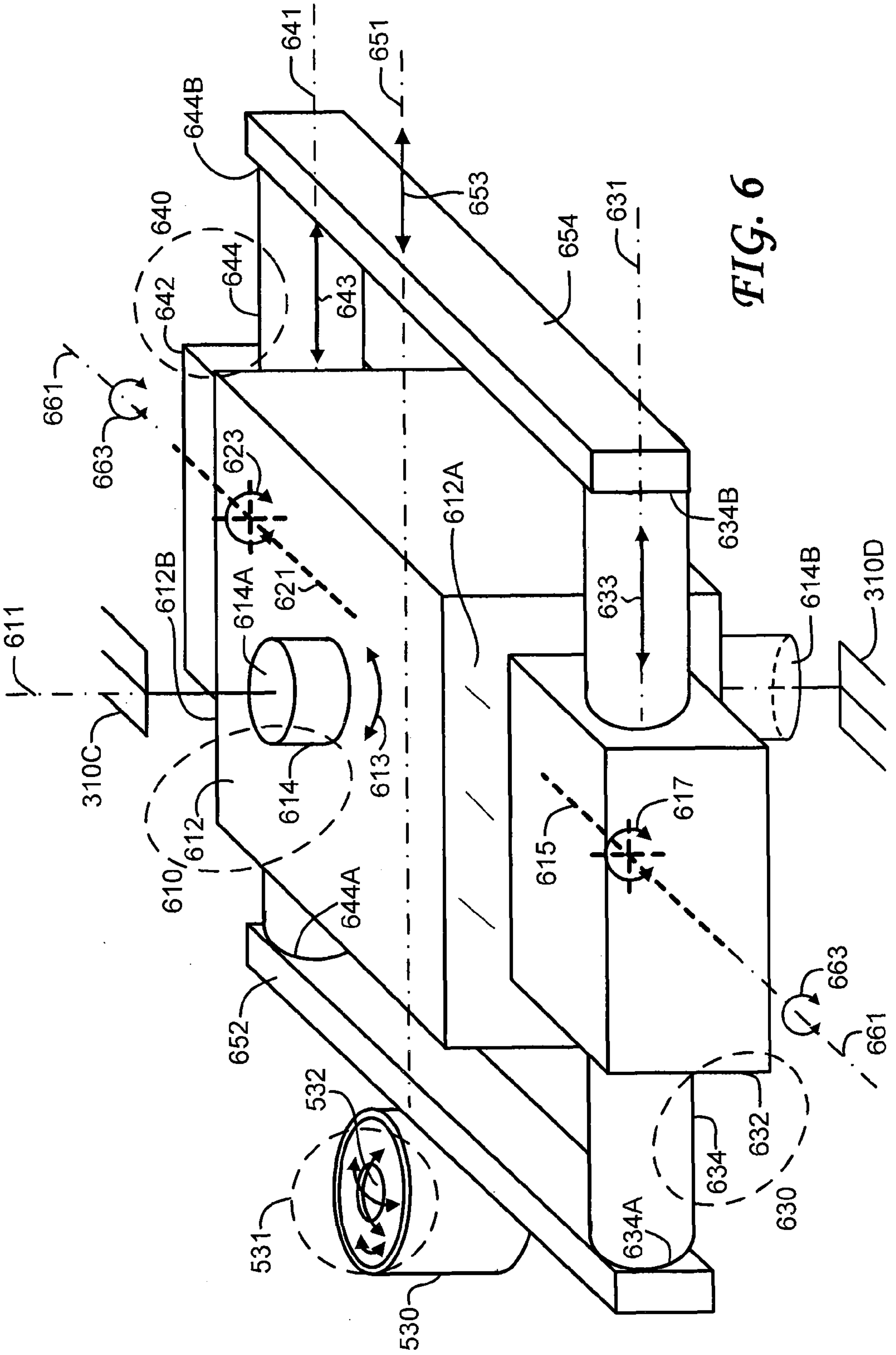
FIG. 6 shows a schematic of a second embodiment of drive motors used in an electrical actuator.

FIG. 5 and FIG. 6 show two embodiments of electrical motor assemblies used in the electrical actuator unit 302. These embodiments show examples of components for implementing the automatic control system and interfaces between the components. The motors are coupled together in sequence. One motor (the outer motor) is rigidly mounted to the case 310 (FIG. 3), which is then rigidly mounted to the dozer body. The other motor (inner motor) is mounted on the moving part of the outer motor. The inner motor moves the joystick. In general, there are two types of electrical motors suitable for the desired task: linear and rotary. There are then four possible combinations of the outer/inner motors: linear/linear, rotary/rotary, linear/rotary, and rotary/linear. The automatic control system also needs to accommodate the passive degrees of freedom described above. Various coupling joints and forks can be used. Forks, however, are not desirable because of low service life due to a high level of friction. The number of joints should also be kept to a minimum as well to make the automatic control system as reliable as possible.

FIG. 5 shows an embodiment with a Cartesian coordinate kinematic geometry; it is based on two orthogonally-mounted linear tubular motors. Such motors can be purchased as off-the-shelf products. The outer motor 510 controls the slope channel (slope of the blade 104). The outer motor 510 includes the stator 512 and the slider 514. The end faces of the slider 514 are rigidly mounted to the case 310 of the electrical actuator unit 302. The end face 514A is mounted to the case 310 at the location 310A; similarly, the end face 514B is mounted to the case 310 at the location 310B.

The slider 514 is a tube filled with strong rare-earth permanent magnets. The stator 512 has a coil and can be moved along the longitudinal axis 511 of the outer motor 510 by applying electrical voltage or current to the coil; translation 513 along the longitudinal axis 511 implements the first active degree of freedom. Note: In this configuration, the slider is fixed, and the stator moves. The stator 512 has an embedded encoder that senses the position of the slider 514. The stator 512 also has a passive rotation degree of freedom that allows it to track the changing height of the clamp 206 that secures the joystick handle 202 to the joystick rod 204 (FIG. 2). Rotation 515 of the stator 512 about the longitudinal axis 511 implements the passive degree of freedom.

The inner motor 520 controls the elevation channel (elevation of the blade 104). The inner motor 520 includes the stator 522 and the slider 524. The stator 522 of the inner motor 520 is rigidly mounted to the stator 512 of the outer motor 510. The slider 524 can be moved along the longitudinal axis 521 of the inner motor 520 by applying electrical voltage or current to the coil in the stator 522. The longitudinal axis 521 is orthogonal to the longitudinal axis 511. Translation 523 along the longitudinal axis 521 of the inner motor 520 implements the second active degree of freedom. The stator 522 has an embedded encoder that senses the position of the slider 524.

The end face 524B of the slider 524 is free. A ball joint 530 is mounted to end face 524A of the slider 524. The ball joint 530 has three passive rotation degrees of freedom 531. Refer to FIG. 2A. At the time of installation, the clamp 206 is loosened, and the joystick handle 202 is removed from the joystick rod 204. Refer to FIG. 3. In this instance, the arm 304 corresponds to the slider 524, and the coupling 306 corresponds to the ball joint 530. The joystick rod 204 is inserted through the central hole 532 of the ball joint 530 (FIG. 5). The joystick handle 202 is then reattached to the joystick rod 204 with the clamp 206.

In some joysticks (such as used for control of electric valves), the joystick handle cannot be detached from the joystick rod. In these cases, a coupling with a split ball and housing can be used. The coupling is placed around a portion of the joystick rod.

FIG. 5 illustrates a basic embodiment from a mechanical point of view. The drawback of this embodiment, however, is increased friction in the outer motor because of the moment caused by a non-zero arm of force applied to the joystick by the motor itself and by the operator while controlling the machine in the manual mode. In this instance, ball bearings can be used to minimize friction and prolong service life. The outer motor should have reserve power to compensate for the friction force.

Note that in FIG. 5, the roles of the inner motor and the outer motor can be interchanged through suitable modifications in the coupling geometry or through suitable changes in the mounting configuration of the electrical actuator unit with respect to the joystick; that is the inner motor can be used for control of the slope channel, and the outer motor can be used for control of the elevation channel.

The embodiment shown in FIG. 6 has a polar coordinate kinematic geometry; it is based on rotary and linear motors. An outer rotary motor controls the slope channel, and an inner linear motor controls the elevation channel. The outer rotary motor 610 includes a stator 612 and a rotor shaft 614. The ends of the rotor shaft 614 are rigidly mounted to the case 310 of the electrical actuator 302 (FIG. 3). The end face 614A is mounted to the case 310 at the location 310C; similarly, the end face 614B is mounted to the case 310 at the location 310D. In FIG. 6, the outer rotary motor 610 corresponds to an in-runner motor, as it is inexpensive and widely used in industry; however, an out-runner motor can be used as well.

It is advantageous to use a brushless high torque rotation servo motor or a hybrid stepper motor in which the rotor is implemented with a bipolar or multipolar strong rare-earth permanent magnet. In some embodiments, the outer rotary motor 610 is outfitted with an encoder that senses the degree of shaft rotation. The stator 612 has a coil and can be rotated about the rotor shaft 614 by applying electrical current or voltage to the coil. The rotation 613 about the longitudinal axis 611 of the outer rotary motor 610 implements the first active degree of freedom for control of the slope channel. Technically, the rotation 613 causes the ball joint 530 to translate along an arc. In practice, however, the arc is approximately a line segment because the radius of rotation is sufficiently large. Note: In this configuration, the shaft is fixed, and the stator moves.

Two inner linear motors are mounted on the outer rotary motor. The first inner linear motor 630 includes the stator 632 and the slider 634. The stator 632 is mounted to a first face (face 612A) of the stator 612 of the outer rotary motor 610 such that the stator 632 can rotate with respect to the stator 612 about the rotation axis 615, which is orthogonal to the longitudinal axis 611 of the rotor shaft 614. The slider 634 can be moved along the longitudinal axis 631 of the inner motor 630 by applying electrical current or voltage to the coil in the stator 632. The stator 632 has an embedded encoder that senses the position of the slider 634.

Similarly, the second inner linear motor 640 includes the stator 642 and the slider 644. The stator 642 is mounted to a second face (face 612B, opposite the face 612A) of the stator 612 of the outer rotary motor 610 such that the stator 642 can rotate with respect to the stator 612 about the rotation axis 621, which is orthogonal to the longitudinal axis 611 of the rotor shaft 614. The rotation axis 621 coincides with the rotation axis 615; the common rotation axis is referenced as the rotation axis 661. The slider 644 can be moved along the longitudinal axis 641 of the inner motor 640 by applying electrical current or voltage to the coil in the stator 642. The stator 642 has an embedded encoder that senses the position of the slider 644.

The end face 634A of the slider 634 and the end face 644A of the slider 644 are rigidly connected by the crossbar 652. Similarly the opposite end faces of the sliders, the end face 634B of the slider 634 and the end face 644B of the slider 644, are rigidly connected by the crossbar 654. The ball joint 530 is mounted to the crossbar 652. Refer to FIG. 3. In this instance, the arm 304 corresponds to the crossbar 652, and the coupling 306 corresponds to the ball joint 530.

Return to FIG. 6. Simultaneous rotation 617 about the rotation axis 615 and rotation 623 about the rotation axis 621 correspond to common rotation 663 about the common rotation axis 661 of the inner motor assembly comprising the inner linear motor 630, the inner linear motor 640, the crossbar 652, and the crossbar 654. The common rotation 663 about the common rotation axis 661 permits the electrical actuator unit to have a passive degree of freedom to track the changing height of the clamp 206. Simultaneous translation 633 of the slider 634 along the longitudinal axis 631 and translation 643 of the slider 644 along the longitudinal axis 641 correspond to a translation 653 of the ball joint 530 along the longitudinal axis 651. Translation 653 along the longitudinal axis 651 provides the second active degree of freedom. The inner motor assembly controls the elevation channel.

This approach improves rigidity of construction, minimizes friction, and doubles the motor force, while keeping compactness of the whole assembly. This configuration permits independent slope and elevation control because of the orthogonality of the tangent force from the outer motor and the cumulative inner forces. The embodiment shown in FIG. 6 is more complex mechanically than the embodiment shown in FIG. 5; however, it uses readily available off-the-shelf components, is more reliable, and is less expensive in production despite using one more motor.

Note that in FIG. 6, the roles of the outer rotary motor and the inner linear motors can be interchanged through suitable modifications in the coupling geometry or through suitable changes in the mounting configuration of the electrical actuator unit with respect to the joystick; that is the outer rotary motor can be used for control of the elevation channel, and the inner linear motors can be used for control of the slope channel.

Except when linear motors are used, linear guides and stages can be used to increase force and rigidity and to minimize friction impact. Other types of linear motors, such as voice coil motors, flat magnet servomotors, and even solenoids can be used. Other types of rotary motors, such as torque angular, brushed, asynchronous, and synchronous motors can be used. Other joints can be used instead of the ball joint 530. Other kinematic geometries can be used.

Figure 7:
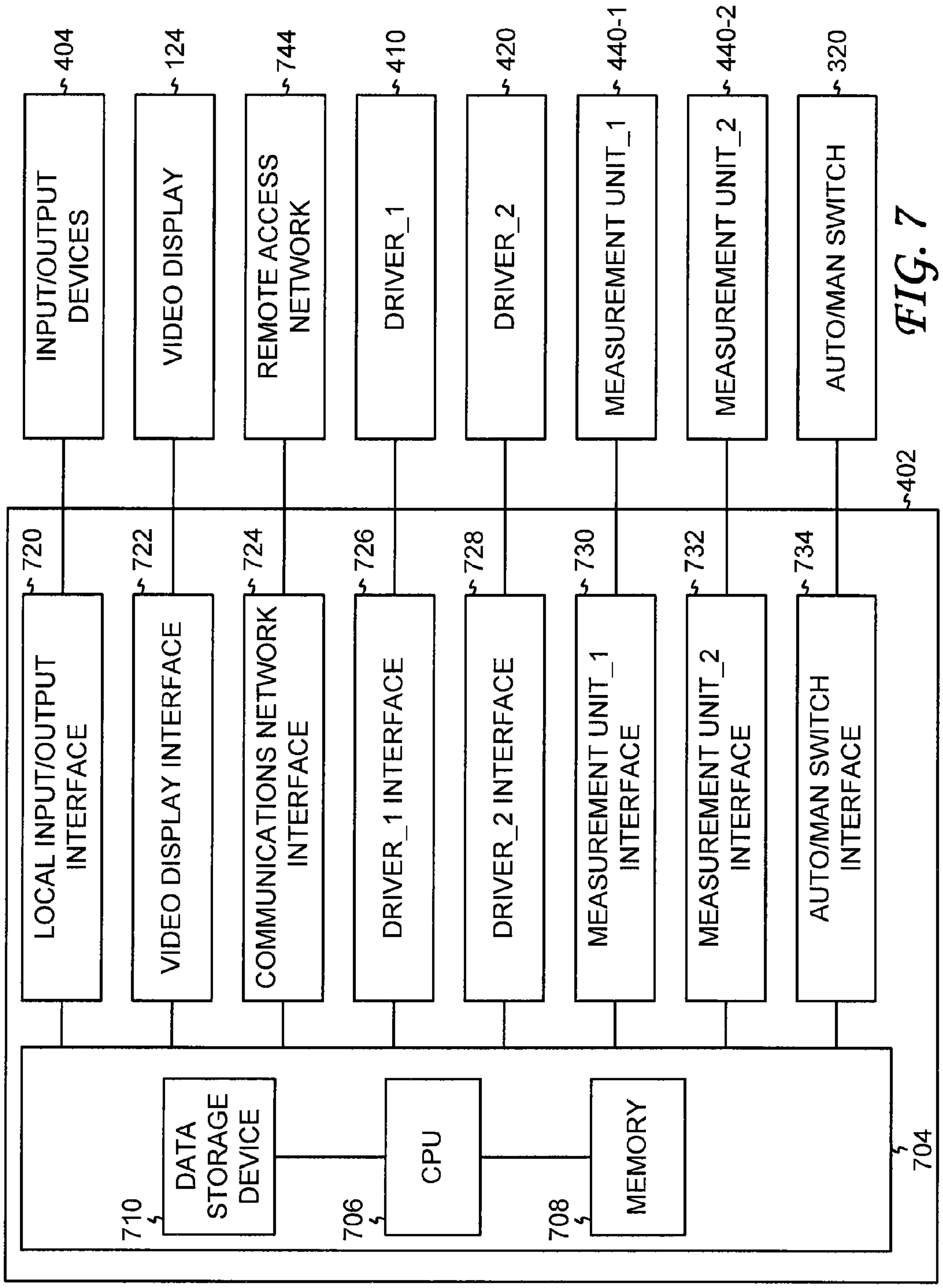
FIG. 7 shows a schematic of a computational system used in an electrical actuator.

FIG. 7 shows a schematic of an embodiment of the computational system 402 used in the electrical actuator unit 302 (FIG. 4A-FIG. 4C). In one configuration, the computational system 402 is housed in the case 310 of the electrical actuator unit 302 (FIG. 3); however, it can also be a separate unit. One skilled in the art can construct the computational system 402 from various combinations of hardware, firmware, and software. One skilled in the art can construct the computational system 402 from various electronic components, including one or more general purpose microprocessors, one or more digital signal processors, one or more application-specific integrated circuits (ASICs), and one or more field-programmable gate arrays (FPGAs).

The computational system 402 comprises a computer 704, which includes a central processing unit (CPU) 706, memory 708, and a data storage device 710. The data storage device 710 includes at least one persistent, tangible, non-transitory computer readable medium, such as semiconductor memory, a magnetic hard drive, or a compact disc read only memory. In an embodiment, the computer 704 is implemented as an integrated device.

The computational system 402 can further comprise a local input/output interface 720, which interfaces the computer 704 to one or more input/output (I/O) devices 404 (FIG. 4A-FIG.

4C). Examples of input/output devices 404 include a keyboard, a mouse, a touch screen, a joystick, a switch, and a local access terminal. Data, including computer executable code, can be transferred to and from the computer 704 via the local input/output interface 720. A user can access the computer 402 via the input/output devices 404. Different users can have different access permissions. For example, if the user is a dozer operator, he could have restricted permission only to enter reference values of blade elevation and blade orientation. If the user is a control engineer or system installation engineer, however, he could also have permission to enter control algorithms and setup parameters.

The computational system 402 can further comprise a video display interface 722, which interfaces the computer 704 to a video display, such as the video display 124 in the operator's cabin (FIG. 1A). The computational system 402 can further comprise a communications network interface 724, which interfaces the computer 704 with a remote access network 744. Examples of the remote access network 744 include a local area network and a wide area network. A user can access the computer 704 via a remote access terminal (not shown) connected to the remote access network 744. Data, including computer executable code, can be transferred to and from the computer 704 via the communications network interface 724.

The computational system 402 can further comprise one or more driver interfaces, such as the driver_1 interface 726 that interfaces the computer 704 with the driver_1 410 and the driver_2 interface 728 that interfaces the computer 704 with the driver_2 420 (FIG. 4A-FIG. 4C).

The computational system 402 can further comprise one or more measurement unit interfaces, such as the measurement unit_1 interface 730 and the measurement unit_2 interface 732 that interface the computer 704 with the measurement unit_1 440-1 and the measurement unit_2 440-2, respectively (FIG. 4A). A measurement unit can also interface to the computer 704 via the local input/output interface 720 or the communications network interface 724.

The computational system 402 can further comprise an auto/man switch interface 734 that interfaces the computer 704 with the auto/man switch 320 (FIG. 3 and FIG. 4A-FIG. 4C).

The interfaces in FIG. 7 can be implemented over various transport media. For example, an interface can transmit and receive electrical signals over wire or cable, optical signals over optical fiber, electromagnetic signals (such as radiofrequency signals) wirelessly, and free-space optical signals.

As is well known, a computer operates under control of computer software, which defines the overall operation of the computer and applications. The CPU 706 controls the overall operation of the computer and applications by executing computer program instructions that define the overall operation and applications. The computer program instructions can be implemented as computer executable code programmed by one skilled in the art. The computer program instructions can be stored in the data storage device 710 and loaded into memory 708 when execution of the program instructions is desired. For example, the control algorithm shown schematically in FIG. 8, and the overall control loops shown schematically in FIG. 4A-FIG. 4C, can be implemented by computer program instructions. Accordingly, by executing the computer program instructions, the CPU 706 executes the control algorithm and the control loops.

Figure 9:
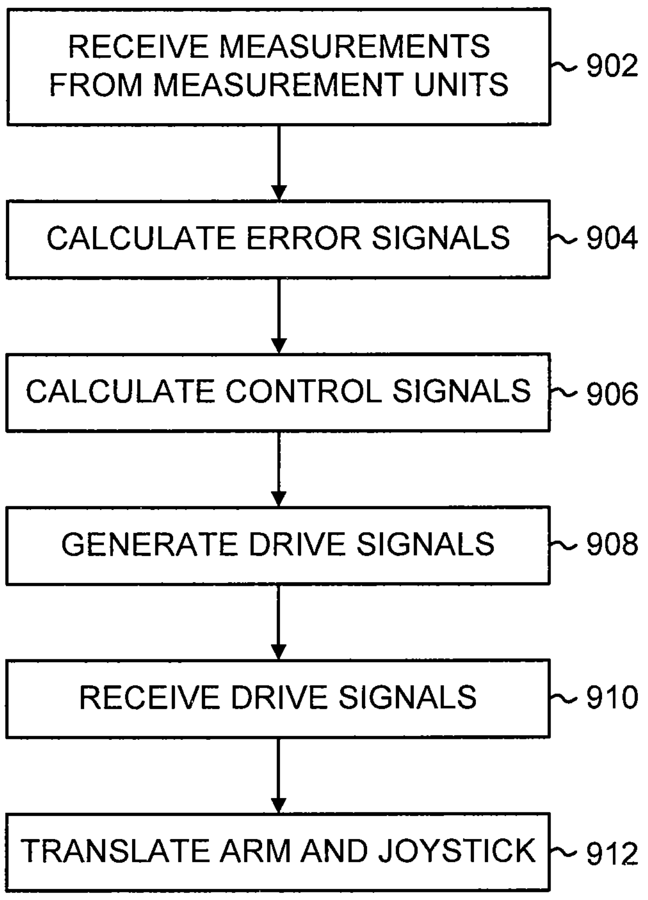
FIG. 9 shows a flowchart of a method for automatically controlling an implement operably coupled to a vehicle body.

FIG. 9 shows a flowchart summarizing a method, according to an embodiment of the invention, for automatically controlling a joystick, in which at least one translation of the joystick controls at least one degree of freedom of an implement operably coupled to a vehicle body. In step 902, a computational system receives at least one set of measurements from at least one measurement unit mounted on the vehicle body, the implement, or both the vehicle body and the implement. The sets of measurements correspond to the at least one degree of freedom; that is, the sets of measurements measure, directly or indirectly, values of the at least one degree of freedom.

In step 904, the computational system calculates at least one error signal based at least in part on the at least one set of measurements, at least one reference value of the at least one degree of freedom, and a control algorithm. The at least one reference value can be entered by an operator, generated by buffering a current measured value, or generated from a digital model. The at least one reference value can be stored in the computational system. The control algorithm can be entered by, for example, a control engineer or system installation engineer, and stored in the computational system.

In step 906, the computational system calculates at least one control signal based at least in part on the at least one error signal. In step 908, at least one driver receives the at least one control signal and generates at least one electrical drive signal based at least in part on the at least one control signal. In step 910, an electrical motor assembly receives the at least one electrical drive signal. The electrical motor assembly is operably coupled to an arm, and the arm is operably coupled to the joystick.

In step 912, in response to receiving the at least one electrical drive signal, the electrical motor assembly automatically controls the arm to translate along at least one automatically-controlled arm trajectory and automatically controls the joystick to translate along at least one automatically-controlled joystick trajectory corresponding to the at least one automatically-controlled arm trajectory. The correspondence between the joystick trajectory and the arm trajectory depends on the coupling between the joystick and the arm. In some embodiments, a trajectory (joystick trajectory or arm trajectory) corresponds to a line segment. In general, a trajectory can correspond to a defined path (for example, specified by a control engineer), which can be curvilinear.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A system for controlling a joystick, wherein at least one translation of the joystick controls at least one degree of freedom of an implement operably coupled to a vehicle body, the system comprising:

an arm operably coupled to the joystick;

an electrical motor assembly operably coupled to the arm;

at least one measurement unit mounted on at least one of the vehicle body or the implement, wherein the at least one measurement unit is configured to generate at least one plurality of measurements corresponding to the at least one degree of freedom;

a computational system configured to:
receive the at least one plurality of measurements;
calculate at least one error signal based at least in part on the at least one plurality of measurements, at least one reference value of the at least one degree of freedom, and a control algorithm; and
calculate at least one control signal based at least in part on the at least one error signal; and
at least one driver configured to:
receive the at least one control signal; and
based at least in part on the at least one control signal, generate at least one electrical drive signal;
wherein the electrical motor assembly is configured to, in response to receiving the at least one electrical drive signal, automatically control the arm to translate along at least one automatically-controlled arm trajectory and automatically control the joystick to translate along at least one automatically-controlled joystick trajectory corresponding to the at least one automatically-controlled arm trajectory.

2. The system of claim 1, wherein:
the at least one degree of freedom of the implement comprises a first degree of freedom of the implement;
the at least one translation of the joystick that controls the at least one degree of freedom of the implement comprises a first translation of the joystick that controls the first degree of freedom of the implement;
the at least one automatically-controlled arm trajectory comprises a first automatically-controlled arm trajectory;
the at least one automatically-controlled joystick trajectory corresponding to the at least one automatically-controlled arm trajectory comprises a first automatically-controlled joystick trajectory corresponding to the first automatically-controlled arm trajectory; and
the first translation of the joystick that controls the first degree of freedom of the implement comprises the first automatically-controlled joystick trajectory corresponding to the first automatically-controlled arm trajectory.

3. The system of claim 2, wherein the first automatically-controlled arm trajectory comprises a first line segment.

4. The system of claim 2, wherein:
the vehicle body comprises a dozer body;
the implement comprises a blade; and
the first degree of freedom of the implement comprises a blade elevation or a blade slope angle.

5. The system of claim 2, wherein:
the at least one degree of freedom of the implement further comprises a second degree of freedom of the implement; and
the at least one translation of the joystick that controls the at least one degree of freedom of the implement further comprises a second translation of the joystick that controls the second degree of freedom of the implement, wherein the second translation of the joystick is manually controlled.

6. The system of claim 5, wherein:
the vehicle body comprises a dozer body;
the implement comprises a blade;
the first degree of freedom of the implement comprises a blade elevation; and
the second degree of freedom of the implement comprises a blade slope angle.

7. The system of claim 5, wherein:
the vehicle body comprises a dozer body;
the implement comprises a blade;
the first degree of freedom of the implement comprises a blade slope angle; and
the second degree of freedom of the implement comprises a blade elevation.

8. The system of claim 1, wherein:
the electrical motor assembly comprises a first electrical motor;
the at least one electrical drive signal comprises a first electrical drive signal;
the at least one automatically-controlled arm trajectory comprises a first automatically-controlled arm trajectory;
the at least one automatically-controlled joystick trajectory corresponding to the at least one automatically-controlled arm trajectory comprises a first automatically-controlled joystick trajectory corresponding to the first automatically-controlled arm trajectory; and
the first electrical motor is configured to, in response to receiving the first electrical drive signal, automatically control the arm to translate along the first automatically-controlled arm trajectory and automatically control the joystick to translate along the first automatically-controlled joystick trajectory corresponding to the first automatically-controlled arm trajectory.

9. The system of claim 1, wherein:
the at least one degree of freedom of the implement comprises:
a first degree of freedom of the implement; and
a second degree of freedom of the implement;
the at least one translation of the joystick that controls the at least one degree of freedom of the implement comprises:
a first translation of the joystick that controls the first degree of freedom of the implement; and
a second translation of the joystick that controls the second degree of freedom of the implement;
the at least one automatically-controlled arm trajectory comprises:
a first automatically-controlled arm trajectory; and
a second automatically-controlled arm trajectory;
the at least one automatically-controlled joystick trajectory corresponding to the at least one automatically-controlled arm trajectory comprises:
a first automatically-controlled joystick trajectory corresponding to the first automatically-controlled arm trajectory; and
a second automatically-controlled joystick trajectory corresponding to the second automatically-controlled arm trajectory;
the first translation of the joystick that controls the first degree of freedom of the implement comprises the first automatically-controlled joystick trajectory corresponding to the first automatically-controlled arm trajectory; and
the second translation of the joystick that controls the second degree of freedom of the implement comprises the second automatically-controlled joystick trajectory corresponding to the second automatically-controlled arm trajectory.

10. The system of claim 9, wherein:
the first automatically-controlled arm trajectory comprises a first line segment; and
the second automatically-controlled arm trajectory comprises a second line segment.

11. The system of claim 9, wherein:
the vehicle body comprises a dozer body;
the implement comprises a blade;

the first degree of freedom of the implement comprises a blade elevation; and the second degree of freedom of the implement comprises a blade slope angle.

12. The system of claim 1, wherein:

the electrical motor assembly comprises:

a first electrical motor; and a second electrical motor;

the at least one electrical drive signal comprises:

a first electrical drive signal; and a second electrical drive signal;

the at least one automatically-controlled arm trajectory comprises:

a first automatically-controlled arm trajectory; and a second automatically-controlled arm trajectory;

the at least one automatically-controlled joystick trajectory corresponding to the at least one automatically-controlled arm trajectory comprises:

a first automatically-controlled joystick trajectory corresponding to the first automatically-controlled arm trajectory; and a second automatically-controlled joystick trajectory corresponding to the second automatically-controlled arm trajectory;

the first electrical motor is configured to, in response to receiving the first electrical drive signal, automatically control the arm to translate along the first automatically-controlled arm trajectory and automatically control the joystick to translate along the first automatically-controlled joystick trajectory corresponding to the first automatically-controlled arm trajectory; and the second electrical motor is configured to, in response to receiving the second electrical drive signal, automatically control the arm to translate along the second automatically-controlled arm trajectory and automatically control the joystick to translate along the second automatically-controlled joystick trajectory corresponding to the second automatically-controlled arm trajectory.

13. The system of claim 1, wherein:

the vehicle body comprises a dozer body;

the implement comprises a blade; and the at least one measurement unit comprises an inertial measurement unit mounted on the blade.

14. The system of claim 13, wherein the at least one measurement unit further comprises:

a global navigation satellite system antenna mounted on the dozer body and a global navigation satellite system receiver mounted on the dozer body;

a global navigation satellite system antenna mounted on the blade and a global navigation satellite system receiver mounted on the dozer body; or a global navigation satellite system antenna mounted on the blade and a global navigation satellite system receiver mounted on the blade.

15. The system of claim 1, wherein:

the vehicle body comprises a dozer body;

the implement comprises a blade; and the at least one measurement unit comprises:

a first inertial measurement unit mounted on the blade; and a second inertial measurement unit mounted on the dozer body.

16. The system of claim 15, wherein the at least one measurement unit further comprises a global navigation satellite system antenna mounted on the dozer body and a global navigation satellite system receiver mounted on the dozer body.

17. A method for controlling a joystick, wherein at least one translation of the joystick controls at least one degree of freedom of an implement operably coupled to a vehicle body, the method comprising the steps of:

receiving at least one plurality of measurements from at least one measurement unit mounted on at least one of the vehicle body or the implement, wherein the at least one plurality of measurements corresponds to the at least one degree of freedom;

calculating at least one error signal based at least in part on the at least one plurality of measurements, at least one reference value of the at least one degree of freedom, and a control algorithm;

calculating at least one control signal based at least in part on the at least one error signal; and generating at least one electrical drive signal based at least in part on the at least one control signal;

wherein:

an arm is operably coupled to the joystick;

an electrical motor assembly is operably coupled to the arm;

the electrical motor assembly, in response to receiving the at least one electrical drive signal, automatically controls the arm to translate along at least one automatically-controlled arm trajectory and automatically controls the joystick to translate along at least one automatically-controlled joystick trajectory corresponding to the at least one automatically-controlled arm trajectory.

18. The method of claim 17, wherein:

the at least one degree of freedom of the implement comprises a first degree of freedom of the implement;

the at least one translation of the joystick that controls the at least one degree of freedom of the implement comprises a first translation of the joystick that controls the first degree of freedom of the implement;

the at least one automatically-controlled arm trajectory comprises a first automatically-controlled arm trajectory;

the at least one automatically-controlled joystick trajectory corresponding to the at least one automatically-controlled arm trajectory comprises a first automatically-controlled joystick trajectory corresponding to the first automatically-controlled arm trajectory; and the first translation of the joystick that controls the first degree of freedom of the implement comprises the first automatically-controlled joystick trajectory corresponding to the first automatically-controlled arm trajectory.

19. The method of claim 18, wherein:

the first automatically-controlled arm trajectory comprises a first line segment.

20. The method of claim 18, wherein:

the vehicle body comprises a dozer body;

the implement comprises a blade; and the first degree of freedom of the implement comprises a blade elevation or a blade slope angle.

21. The method of claim 18, wherein:

the at least one degree of freedom of the implement further comprises a second degree of freedom of the implement; and the at least one translation of the joystick that controls the at least one degree of freedom of the implement further comprises a second translation of the joystick that controls the second degree of freedom of the implement, wherein the second translation of the joystick is manually controlled.

22. The method of claim 21, wherein:
the vehicle body comprises a dozer body;
the implement comprises a blade;
the first degree of freedom of the implement comprises a blade elevation; and
the second degree of freedom of the implement comprises a blade slope angle.

23. The method of claim 21, wherein:
the vehicle body comprises a dozer body;
the implement comprises a blade;
the first degree of freedom of the implement comprises a blade slope angle; and
the second degree of freedom of the implement comprises a blade elevation.

24. The method of claim 17, wherein:
the electrical motor assembly comprises a first electrical motor;
the at least one electrical drive signal comprises a first electrical drive signal;
the at least one automatically-controlled arm trajectory comprises a first automatically-controlled arm trajectory;
the at least one automatically-controlled joystick trajectory corresponding to the at least one automatically-controlled arm trajectory comprises a first automatically-controlled joystick trajectory corresponding to the first automatically-controlled arm trajectory; and
the first electrical motor, in response to receiving the first electrical drive signal, automatically controls the arm to translate along the first automatically-controlled arm trajectory and automatically controls the joystick to translate along the first automatically-controlled joystick trajectory corresponding to the first automatically-controlled arm trajectory.

25. The method of claim 17, wherein:
the at least one degree of freedom of the implement comprises:
a first degree of freedom of the implement; and
a second degree of freedom of the implement;
the at least one translation of the joystick that controls the at least one degree of freedom of the implement comprises:
a first translation of the joystick that controls the first degree of freedom of the implement; and
a second translation of the joystick that controls the second degree of freedom of the implement; and
the at least one automatically-controlled arm trajectory comprises:
a first automatically-controlled arm trajectory; and
a second automatically-controlled arm trajectory;
the at least one automatically-controlled joystick trajectory corresponding to the at least one automatically-controlled arm trajectory comprises:
a first automatically-controlled joystick trajectory corresponding to the first automatically-controlled arm trajectory; and
a second automatically-controlled joystick trajectory corresponding to the second automatically-controlled arm trajectory;
the first translation of the joystick that controls the first degree of freedom of the implement comprises the first automatically-controlled joystick trajectory corresponding to the first automatically-controlled arm trajectory; and
the second translation of the joystick that controls the second degree of freedom of the implement comprises the second automatically-controlled joystick trajectory corresponding to the second automatically-controlled arm trajectory.

26. The method of claim 25, wherein:
the first automatically-controlled arm trajectory comprises a first line segment; and
the second automatically-controlled arm trajectory comprises a second line segment.

27. The method of claim 25, wherein:
the vehicle body comprises a dozer body;
the implement comprises a blade;
the first degree of freedom of the implement comprises a blade elevation; and
the second degree of freedom of the implement comprises a blade slope angle.

28. The method of claim 17, wherein:
the electrical motor assembly comprises:
a first electrical motor; and
a second electrical motor;
the at least one electrical drive signal comprises:
a first electrical drive signal; and
a second electrical drive signal;
the at least one automatically-controlled arm trajectory comprises:
a first automatically-controlled arm trajectory; and
a second automatically-controlled arm trajectory;
the at least one automatically-controlled joystick trajectory corresponding to the at least one automatically-controlled arm trajectory comprises:
a first automatically-controlled joystick trajectory corresponding to the first automatically-controlled arm trajectory; and
a second automatically-controlled joystick trajectory corresponding to the second automatically-controlled arm trajectory;
the first electrical motor, in response to receiving the first electrical drive signal, automatically controls the arm to translate along the first automatically-controlled arm trajectory and automatically controls the joystick to translate along the first automatically-controlled joystick trajectory corresponding to the first automatically-controlled arm trajectory; and
the second electrical motor, in response to receiving the second electrical drive signal, automatically controls the arm to translate along the second automatically-controlled arm trajectory and automatically controls the joystick to translate along the second automatically-controlled joystick trajectory corresponding to the second automatically-controlled arm trajectory.

29. The method of claim 17, wherein:
the vehicle body comprises a dozer body;
the implement comprises a blade; and
the at least one measurement unit comprises an inertial measurement unit mounted on the blade.

30. The method of claim 29, wherein the at least one measurement unit further comprises:
a global navigation satellite system antenna mounted on the dozer body and a global navigation satellite system receiver mounted on the dozer body;
a global navigation satellite system antenna mounted on the blade and a global navigation satellite system receiver mounted on the dozer body; or
a global navigation satellite system antenna mounted on the blade and a global navigation satellite system receiver mounted on the blade.

31. The method of claim 17, wherein
the vehicle body comprises a dozer body;
the implement comprises a blade; and
the at least one measurement unit comprises:
a first inertial measurement unit mounted on the blade; and
a second inertial measurement unit mounted on the dozer body.

32. The method of claim 31, wherein the at least one measurement unit further comprises a global navigation satellite system antenna mounted on the dozer body and a global navigation satellite system receiver mounted on the dozer body.

33. An electrical actuator unit for controlling a joystick, wherein at least one translation of the joystick controls at least one degree of freedom of an implement operably coupled to a vehicle body, the electrical actuator unit comprising:
an arm configured to be operably coupled to the joystick;
an electrical motor assembly operably coupled to the arm;
a computational system configured to:
receive at least one plurality of measurements from at least one measurement unit mounted on at least one of the vehicle body or the implement, wherein the at least one plurality of measurements corresponds to the at least one degree of freedom;
calculate at least one error signal based at least in part on the at least one plurality of measurements, at least one reference value of the at least one degree of freedom, and a control algorithm; and
calculate at least one control signal based at least in part on the at least one error signal; and
at least one driver configured to:
receive the at least one control signal; and
based at least in part on the at least one control signal, generate at least one electrical drive signal;
wherein:
the electrical motor assembly is configured to, in response to receiving the at least one electrical drive signal, automatically control the arm to translate along at least one automatically-controlled arm trajectory; and
the arm is configured to, when it is operably coupled to the joystick, automatically control the joystick to translate along at least one automatically-controlled joystick trajectory corresponding to the at least one automatically-controlled arm trajectory.

34. The electrical actuator unit of claim 33, wherein:
the at least one degree of freedom of the implement comprises a first degree of freedom of the implement;
the at least one translation of the joystick that controls the at least one degree of freedom of the implement comprises a first translation of the joystick that controls the first degree of freedom of the implement;
the at least one automatically-controlled arm trajectory comprises a first automatically-controlled arm trajectory;
the at least one automatically-controlled joystick trajectory corresponding to the at least one automatically-controlled arm trajectory comprises a first automatically-controlled joystick trajectory corresponding to the first automatically-controlled arm trajectory; and
the first translation of the joystick that controls the first degree of freedom of the implement comprises the first automatically-controlled joystick trajectory corresponding to the first automatically-controlled arm trajectory.

35. The electrical actuator unit of claim 33, wherein:
the electrical motor assembly comprises a first electrical motor;
the at least one electrical drive signal comprises a first electrical drive signal;
the at least one automatically-controlled arm trajectory comprises a first automatically-controlled arm trajectory;
the at least one automatically-controlled joystick trajectory corresponding to the at least one automatically-controlled arm trajectory comprises a first automatically-controlled joystick trajectory corresponding to the first automatically-controlled arm trajectory;
the first electrical motor is configured to, in response to receiving the first electrical drive signal, automatically control the arm to translate along the first automatically-controlled arm trajectory; and
the arm is configured to, when it is operably coupled to the joystick, automatically control the joystick to translate along the first automatically-controlled joystick trajectory corresponding to the first automatically-controlled arm trajectory.

36. The electrical actuator unit of claim 33, wherein:
the at least one degree of freedom of the implement comprises:
a first degree of freedom of the implement; and
a second degree of freedom of the implement;
the at least one translation of the joystick that controls the at least one degree of freedom of the implement comprises:
a first translation of the joystick that controls the first degree of freedom of the implement; and
a second translation of the joystick that controls the second degree of freedom of the implement;
the at least one automatically-controlled arm trajectory comprises:
a first automatically-controlled arm trajectory; and
a second automatically-controlled arm trajectory;
the at least one automatically-controlled joystick trajectory corresponding to the at least one automatically-controlled arm trajectory comprises:
a first automatically-controlled joystick trajectory corresponding to the first automatically-controlled arm trajectory; and
a second automatically-controlled joystick trajectory corresponding to the second automatically-controlled arm trajectory;
the first translation of the joystick that controls the first degree of freedom of the implement comprises the first automatically-controlled joystick trajectory corresponding to the first automatically-controlled arm trajectory; and
the second translation of the joystick that controls the second degree of freedom of the implement comprises the second automatically-controlled joystick trajectory corresponding to the second automatically-controlled arm trajectory.

37. The electrical actuator unit of claim 33, wherein:
the electrical motor assembly comprises:
a first electrical motor; and
a second electrical motor;
the at least one electrical drive signal comprises:
a first electrical drive signal; and
a second electrical drive signal;

the at least one automatically-controlled arm trajectory comprises:

a first automatically-controlled arm trajectory; and a second automatically-controlled arm trajectory;

the at least one automatically-controlled joystick trajectory corresponding to the at least one automatically-controlled arm trajectory comprises:

a first automatically-controlled joystick trajectory corresponding to the first automatically-controlled arm trajectory; and a second automatically-controlled joystick trajectory corresponding to the second automatically-controlled arm trajectory;

the first electrical motor is configured to, in response to receiving the first electrical drive signal, automatically control the arm to translate along the first automatically-controlled arm trajectory;

the arm is configured to, when it is operably coupled to the joystick, automatically control the joystick to translate along the first automatically-controlled joystick trajectory corresponding to the first automatically-controlled arm trajectory;

the second electrical motor is configured to, in response to receiving the second electrical drive signal, automatically control the arm to translate along the second automatically-controlled arm trajectory; and the arm is configured to, when it is operably coupled to the joystick, automatically control the joystick to translate along the second automatically-controlled joystick trajectory corresponding to the second automatically-controlled arm trajectory.

* * * * *